United States Patent
Makinen et al.

(10) Patent No.: US 11,812,116 B2
(45) Date of Patent: Nov. 7, 2023

(54) APPARATUS AND METHODS FOR ENHANCED CONTENT CONTROL, CONSUMPTION AND DELIVERY IN A CONTENT DISTRIBUTION NETWORK

(71) Applicant: Charter Communications Operating, LLC, St. Louis, MO (US)

(72) Inventors: Sami S. Makinen, Littleton, CO (US); Yassine Maalej, Englewood, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/654,662

(22) Filed: Oct. 16, 2019

(65) Prior Publication Data

US 2021/0120315 A1    Apr. 22, 2021

(51) Int. Cl.
*H04N 21/236* (2011.01)
*H04N 21/4402* (2011.01)
(Continued)

(52) U.S. Cl.
CPC ....... *H04N 21/64753* (2013.01); *G06F 3/017* (2013.01); *H04N 21/236* (2013.01);
(Continued)

(58) Field of Classification Search
CPC ................ G06F 3/017; H04N 1/00442; H04N 21/64753; H04N 21/23106; H04N 21/236;
(Continued)

(56) References Cited

U.S. PATENT DOCUMENTS 6,223,222 B1 * 4/2001 Fijolek ............... H04N 7/17318
                                                    348/E7.071
8,997,136 B2    3/2015 Brooks et al.
(Continued)

FOREIGN PATENT DOCUMENTS

GB        2495159 A  *  4/2013  .......... G02B 27/017
KR  20140002008 A  *  1/2014  .............. G06T 7/20

OTHER PUBLICATIONS

"DOCSIS 3.0 Management Features Differences Technical Report" CM-TR-MGMT V3.0-DIFF-V01-071228, 2007, 62 pages.
(Continued)

*Primary Examiner* — Robert J Hance
(74) *Attorney, Agent, or Firm* — Patent Beach PC

(57) ABSTRACT

Apparatus and methods for providing an aggregated and interactive content service over a network. In one embodiment, extant high-bandwidth capabilities of a managed network are leveraged for delivering content downstream to network users or subscribers, and standards-compliant ultra-low latency and high data rate services (e.g., 5G NR based) are leveraged for (i) uploading content, and (ii) enabling interaction with the content based on user input. In one embodiment, the exemplary apparatus and methods are implemented to aggregate content from various third-party sources at a managed content delivery network (CDN) and deliver it as a combined or fused single stream (versus multiple distinct content streams), and allow interaction with the aggregated content stream via the low-latency connection to the aggregation processing entity. Additional enhancements enable user participation individually, or with other subscribers, in live or recorded content-based activities (such as via gesture recognition and learned "skills").

21 Claims, 21 Drawing Sheets

(51) Int. Cl.
    *H04N 21/231*     (2011.01)
    *H04N 21/647*     (2011.01)
    *G06F 3/01*     (2006.01)
    *H04N 21/61*     (2011.01)
    *H04N 21/6437*     (2011.01)
    *H04N 21/2665*     (2011.01)

(52) U.S. Cl.
    CPC ... *H04N 21/23106* (2013.01); *H04N 21/2665* (2013.01); *H04N 21/4402* (2013.01); *H04N 21/6125* (2013.01); *H04N 21/6131* (2013.01); *H04N 21/6437* (2013.01)

(58) Field of Classification Search
    CPC ........... H04N 21/2665; H04N 21/4402; H04N 21/6125; H04N 21/6131; H04N 21/6437; H04N 21/6118; H04N 21/6181
    See application file for complete search history.

(56) References Cited

U.S. PATENT DOCUMENTS

| | | | |
|---|---|---|---|
| 9,213,538 | B1 | 12/2015 | Ladd et al. |
| 10,306,174 | B1* | 5/2019 | Grafton .................. G06F 9/451 |
| 2002/0087976 | A1 | 7/2002 | Kaplan et al. |
| 2003/0197785 | A1* | 10/2003 | White ................ H04N 21/2187 |
| | | | 348/E7.086 |
| 2006/0130113 | A1 | 6/2006 | Carlucci et al. |
| 2009/0100459 | A1 | 4/2009 | Riedl et al. |
| 2011/0107379 | A1 | 5/2011 | Lajoie et al. |
| 2012/0038550 | A1* | 2/2012 | Lemmey ................. A63F 13/42 |
| | | | 345/156 |
| 2012/0124606 | A1 | 5/2012 | Tidwell et al. |
| 2012/0317598 | A1* | 12/2012 | Gilson ................... H04N 5/445 |
| | | | 725/32 |
| 2013/0039442 | A1 | 2/2013 | Smallcomb et al. |
| 2013/0340018 | A1* | 12/2013 | Li .................... H04N 21/47202 |
| | | | 725/110 |
| 2014/0062866 | A1* | 3/2014 | Yamashita ............. G06V 10/56 |
| | | | 345/156 |
| 2014/0071344 | A1 | 3/2014 | Francisco |
| 2014/0082645 | A1 | 3/2014 | Stern |
| 2014/0092254 | A1 | 4/2014 | Mughal et al. |
| 2014/0247964 | A1* | 9/2014 | Kurokawa .............. G06F 3/017 |
| | | | 382/103 |
| 2016/0239259 | A1* | 8/2016 | Lenchner ............ G10L 15/1822 |
| 2017/0026712 | A1 | 1/2017 | Gonder et al. |
| 2018/0097690 | A1 | 4/2018 | Yocam et al. |
| 2019/0069004 | A1 | 2/2019 | Badawiyeh |
| 2019/0089997 | A1 | 3/2019 | Badawiyeh |
| 2019/0182554 | A1 | 6/2019 | Schupak et al. |
| 2019/0320322 | A1 | 10/2019 | Jayawardene et al. |
| 2020/0083987 | A1* | 3/2020 | Xu ........................ H04L 1/0069 |
| 2020/0186575 | A1 | 6/2020 | Rofe |
| 2020/0204603 | A1 | 6/2020 | Upadhyaya |
| 2020/0344515 | A1 | 10/2020 | Wong et al. |

OTHER PUBLICATIONS

"DOCSIS 3.0 OSSI Configuration Management Technical Report" CM-TR-OSSIv3.0-CM-V01-080926, 2008, 84 pages.

ETSI GR MEC-IEG 005 V1.1.1 (Aug. 2015), Mobile-Edge Computing (MEC), Proof of Concept Framework.

ETSI GS MEC 029 V2.1.1 (Jul. 2019), Multi-access Edge Computing (MEC), Fixed Access Information API.

"Latency Reduction for Mobile Backhaul by Pipelining LTE and DOCSIS," 2017 IEEE Global Communications Conference, Dec. 4-8, 2017.

Raszuk, et al., "Distribution of Diverse BGP Paths; RFC6774.txt", Distribution of Diverse BGP Paths; RFC6774.TXT, Internet Engineering Task Force, IETF; Standard, Internet Society (ISOC) 4, Rue Des Falaises CH-1205 Geneva, Switzerland, Nov. 6, 2012 (Nov. 6, 2012), pp. 1-22, XP015086470, [retrieved on Nov. 6, 2012].

\* cited by examiner

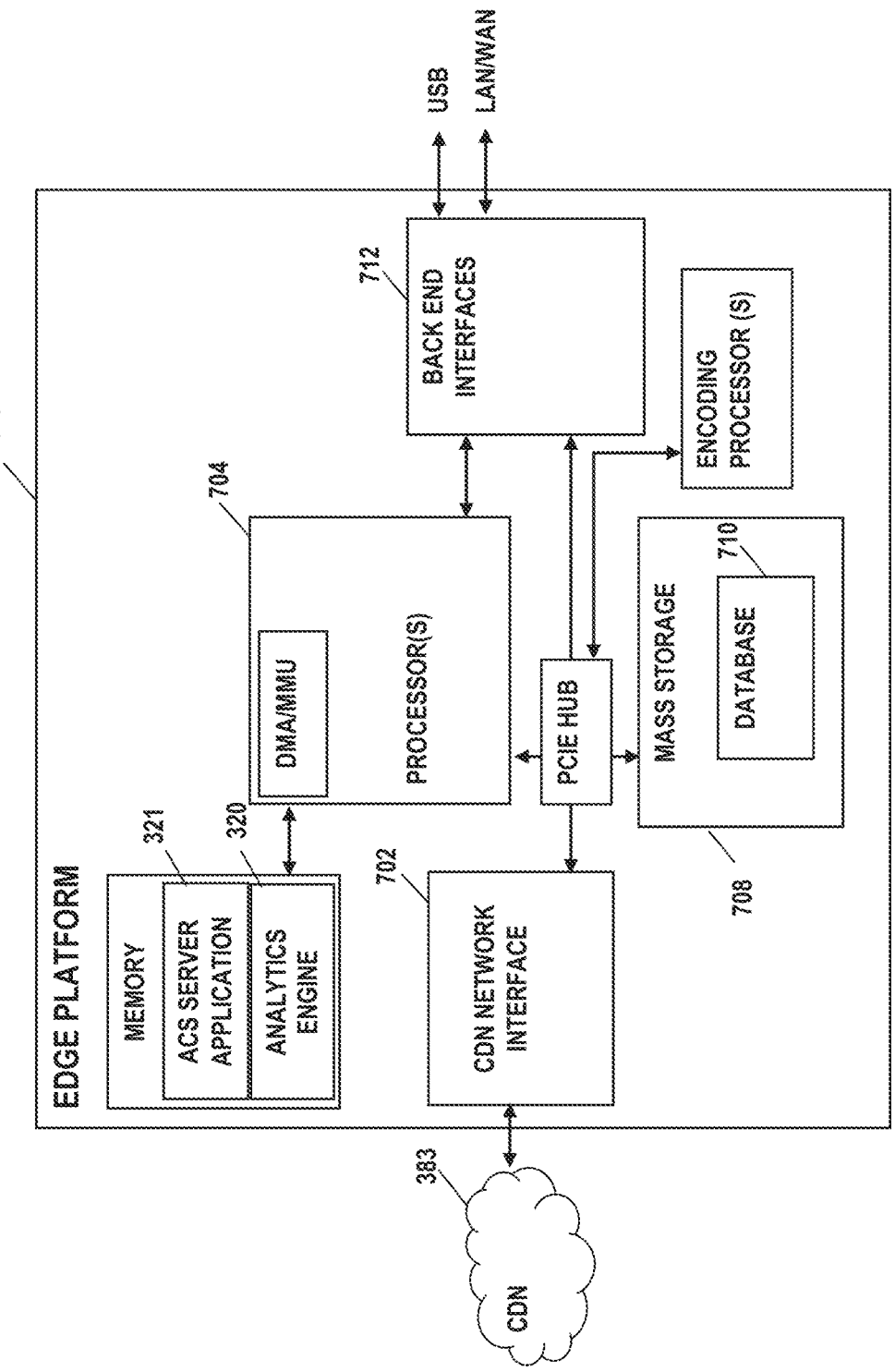

APPARATUS AND METHODS FOR ENHANCED CONTENT CONTROL, CONSUMPTION AND DELIVERY IN A CONTENT DISTRIBUTION NETWORK

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of content delivery, and specifically in one exemplary aspect to an architecture which integrates or unifies commands (e.g., user input, controls) with content from multiple content sources (e.g., uploaded user-generated content, network programming (such as for example television shows and live-events), and local channels or sources).

2. Description of Related Technology

Data communication services are now ubiquitous throughout user premises (e.g., home, office, and even vehicles). Such data communication services may be provided via a managed or unmanaged network. For instance, a typical home has services provided by one or more network service providers via a managed network such as a cable or satellite network. These services may include content delivery (e.g., linear television, on-demand content, personal or cloud DVR, "start over", etc.), as well as so-called "over the top" third party content such as streaming content such as Netflix or Hulu. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere, anytime," so that users (e.g., subscribers) can access the desired services—e.g., watch their favorite series or movie—via a number of different receiving and rendering platforms, including in different rooms of their house, on their mobile device while traveling, while outdoors, etc.

Additionally, the proliferation of the Internet and increased connection technologies such as broadband, and incipient 3GPP 5G NR (New Radio) technologies have contributed to the development of new media sources for information and entertainment. Accordingly, new and interesting opportunities for providing users with advanced features, applications and services have arisen, enabling users to tailor their viewing experience more to their particular interests and liking, including via video clips or "shorts."

For example, uploaded content is often broadly shared with other users via social media platforms such as Youtube or the like. Real-time "commentator" types of broadcasting is also very popular for gamers (e.g., Twitch) to allow audiences to participate in and comment on the actions of players or gamers. Other programs and services, such as Snapchat and Instagram, provide tools for altering uploaded content (e.g. changing clip duration, zooming, adding audio or text commentary, cropping, filter effects, etc.) before broadcasting to others.

Managed Content Distribution Networks

Network operators deliver data services (e.g., broadband) and video products, including the above-described services, to customers using a variety of different devices, thereby enabling their users or subscribers to access data/content in a number of different contexts, both fixed (e.g., at their residence) and mobile (such as while traveling or away from home). FIG. 1 is a functional block diagrams illustrating a typical prior art managed (e.g., cable) content delivery network architecture used to provide such data services to its users and subscribers.

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC or HEVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

Within the cable plant, VOD and so-called switched digital video (SDV) may also be used to provide content, and utilize a single-program transport stream (SPTS) delivery modality. In U. S. cable systems for example, downstream RF channels used for transmission of television programs are 6 MHz wide, and occupy a 6 MHz spectral slot between 54 MHz and 860 MHz. Deployments of VOD services have to share this spectrum with already established analog and digital cable television services such as those described above.

Within a given cable plant, all homes that are electrically connected to the same cable feed running through a neighborhood will receive the same downstream signal. For the purpose of managing e.g., VOD services, these homes are grouped into logical groups typically called Service Groups. Homes belonging to the same Service Group receive their VOD service on the same set of RF channels.

Over-The-Top (OTT) Delivery

Alternatively, so-called "over-the-top" or OTT delivery may be used for providing services within a network, wherein content from a third party source who may be unaffiliated with the network operator (e.g., the MSO of the cable system discussed above with respect to FIG. 1) provides content directly to the requesting user or subscriber via or "over the top of" the network operator's infrastructure; i.e., the content is packetized and routed for delivery to the requesting user based on the user's network or IP address, such as via the aforementioned high-speed DOCSIS cable modem, according to the well-known Internet Protocol network-layer protocol. In this model, the underlying managed network is merely an agnostic bearer or sorts to the OTT content; the content source and managed network operator are in effect completely decoupled from one another.

IP unicasts (point to point) or multicasts (point to multiple points) have traditionally been used as the mechanism by which the OTT content is distributed over the network, via the user accessing a prescribed URL and logging in with their credentials to gain access to the content. The IP content is then streamed via the unicast/multicast to the requesting user(s), and received and decoded by a media player application program ("app") on the user's PC, laptop, or other IP-enabled end-user device.

One type of service widely used by casual consumers, small businesses, and enterprises is OTT voice services. Generally speaking, an OTT application uses a data network of a device (e.g., desktop, laptop, smartphone, tablet) to offer a service that is provided by a third party other than a network operator. Such OTT services may be packaged and delivered by vendors as Voice over Internet Protocol (VoIP), which is a type of digital telephony that uses the Internet Protocol. These services rely on existing public and/or private data communication services and architectures (e.g., IP networks managed by one or more network operators) to offer a high-speed and low-cost alternative (often free after initial setup costs, if any) to, for example, phone systems that utilize a traditional circuit-switched telephony infrastructure or digital telephony from a service provider. OTT voice services may enable myriad of additional features such as worldwide access, screen sharing, video, call forwarding, voicemail, and group or conference calls with multiple participants. OTT voice services may also be incorporated into other Internet-based applications such as voice chat in gaming, or as an additional component to text-based chats.

Examples of OTT applications that have at least one voice feature include Facebook Messenger, Skype, FaceTime, Google Talk, WhatsApp, Viber, KakaoTalk, and LINE. These applications provide voice services (among others) by leasing one or more servers and wireless services from a mobile operator to deliver and receive voice data packets.

Voice over Long Term Evolution (VoLTE), and it's incipient 5G cousin Voice over New Radio (VoNR) is an extension of voice OTT applications and uses a device's LTE or NR data connection (see discussion of 3GPP technologies below). Voice traffic exchanged over a 3GPP-based network, such as 3G, 4G and 5G, conforms to VoIP standards and similarly circumvents the aforementioned analog or copper telephony service provider infrastructure. Additionally, it is flexible in providing uninterrupted service even in areas where LTE (4G/4.5G) is unavailable, being able to fall back on 3G connectivity in the case of VoLTE. VoLTE is typically provided by a mobile service operator, rather than by a third party. Hence, VoLTE is technically not an OTT application; however, it is useful for providing services resembling VoIP, and has similar downsides.

Content Encoding and "Fusion"—

FIG. 2 shows a typical prior art encoding and delivery architecture 200. As shown, this architecture 200 generally comprises one or more content distribution systems (e.g., CDN) 202 that is/are in data communication with one or more client devices (or premises, such as households or enterprises) 206. The client devices 206 may include for example DSTBs, home gateway devices and/or media client devices.

As shown, the architecture 200 of FIG. 2 also includes at least one content source 201 providing content to a CDN 202. Various third party and/or internal (i.e., MSO owned or operated) content sources 201 may provide content to the CDN 202. For example, content may be received from a local, regional, or network content library. Alternatively, content may be received from linear analog or digital feeds, as well as various third party content sources.

In some cases, one or more encoder processes 203 encodes a source file from the content source(s) 201 into at least one encoding format (e.g., transcodes a source file from one format to at least one other format). The variety of encodings may be utilized by the CDN cache (and the packager) via adaptive bitrate (ABR) streaming. The various individual content streams are then delivered (and controlled) individually to/by different client devices as shown in FIG. 2. The required downstream bandwidth for delivery to each of the clients is effectively additive (i.e., the sum of the individual stream bandwidths). As such, when a given client or premises wishes to receive multiple encoded data streams simultaneously (such as for e.g., decode and rendering on a common device or multiple devices), significant bandwidth may be consumed, and such bandwidth is directly proportional to the number of different streams requested. Hence, if a given client or premises wishes to receive a number of streams simultaneously, and this type of request is multiplied across many users of the managed network, the extant network infrastructure (including anything from the originating encoders through the downstream distribution network, e.g., cable plant) may rapidly be overtaxed, especially if the requested encoded streams have a comparatively high bitrate (e.g., are MPEG-2 or H.264 or HEVC encoded).

Moreover, in order to support advanced functions such as interactive content overlay or multi-content fusion (e.g., annotated or at least in part derived from user inputs or uploaded content), user-generated or third-party content (e.g., text, audio and/or video) with network programming or OTT encoded content carried over e.g., the MSO network of FIGS. 1-2, the overlaid content and network programming/encoded content generally have to be combined externally, such as at a centralized network entity (e.g., the encoder of FIG. 2) or via third party Internet-based servers, and are provided separately. Accordingly, the user-generated or third party content must be uploaded to the centralized network entity or third party Internet based servers, typically using upstream bandwidth on the managed network (e.g., upstream DOCSIS channels).

However, the download capability of the extant managed network infrastructure (e.g., FIG. 1) has a much larger bandwidth than upstream capability, both for "in-band" and DOCSIS RF channels. For example, a typical upload (UL) speed is about 5 Mbps while download (DL) can be up to 100 Mbps (see, e.g., http://www.dslreports.com/faq/15643). For the UL latency, a typical value can be in the range of 20-50 ms (see e.g., "Latency Reduction for Mobile Backhaul by Pipelining LTE and DOCSIS," 2017 IEEE Global Communications Conference, 4-8 Dec. 2017, which is incorporated herein by reference in its entirety). Therefore, there will necessarily be some discrepancy between the time references for purposes of synchronization and/or fusion; e.g., when a user viewed a given content element or event sent via a downstream channel, and the content the user sends via an upstream channel to be integrated with the content sent downstream (e.g., fusion of a running commentary by users of a common broadcast or video stream). This is especially true where there is a wide range or variability in performance across one or both of the delivery channels (e.g., highly variable latency and/or bandwidth).

User Interfaces and Remote Controls—

Typically, users within a content delivery network interface with the content network infrastructure via a user interface (UI), which may include for instance an IR remote control unit (e.g., a hand-held device 212 as shown in FIG. 2), a capacitive touchscreen device (e.g., the user's tablet or smartphone), and/or voice inputs via e.g., local or cloud-based speech recognition technology. For instance a user wishing to change the channel may select an icon on their touch screen, a button on their remote, or say "change channel" or the like. Such user interfaces are, where something beyond local control is required (e.g., a simple retune of an RF tuner), all necessarily tethered back through the content delivery network; for instance, a tablet or smartphone will utilize an app running thereon to invoke BLE or other PAN-based wireless communication with the user's DSTB or Smart TV or streaming device to control the latter, and control data is passed back up the distribution backhaul (e.g., to an MSO server, OTT or Internet streaming server, or other source)—see the exemplary control signaling 210 shown in FIG. 2 discussed supra.

Similarly, for voice recognition inputs, a cloud server is typically utilized for recognition and search functions, the search input being passed upstream to the cloud server for analysis/execution, and the results returned to the requesting device via the downstream channel of the backhaul.

Better Solutions Needed

Even with the great advances in wireless data rate, robustness and extended coverage afforded by extant 4/4.5G (e.g. LTE/LTE-A) and WLAN systems, significant disabilities still exist in user interface technology, and content delivery and consumption. Specifically, a user is typically linked to particular devices in a specific location (e.g., TV screens or microphone on a remote) and hand-held devices that do not offer a truly "hands free" means to consume and interact with the content regardless of its source (i.e., the user is still required to use a remote or other input mechanism such as touch screen input to control the device, and must be within a certain proximity thereof to use it, whether for service-provider originated content or OTT content merely carried over the service provider network).

Moreover, current content delivery and UI paradigms lack consumer interactive engagement including opportunities for real-time consumer-initiated content insertion or customization.

Accordingly, improved apparatus and methods are needed to, inter alia, provide an integrated and interactive media platform that is capable of, e.g., receiving interactive user input via a "no remote" model, and aggregating two or more different media streams (e.g., streams carrying network programming, user content (from one or more users), OTT content, and user input such that the content/input is combined or integrated in a composite content stream.

Such methods and apparatus would advantageously leverage stable, low-latency mechanisms for the download and upload of data so as to enable predictable and stable transport for, inter alia, aggregation of the constituent data streams, as well as truly interactive real-time control and user input.

SUMMARY

The present disclosure addresses the foregoing needs by providing, inter alia, methods and apparatus for generation of aggregated content are disclosed.

In a first aspect, a method of providing user-defined multi-content stream data delivery to a user of a content distribution network is disclosed. In one embodiment, a local compute platform is used to collect user gesture input data and forward the data to at least a micro-edge compute platform for further processing and implementation of control functions relating to a fused or single content stream delivered to the user(s) via a low-latency backhaul.

In a second aspect, a method of controlling a content stream by a user of a content distribution network is disclosed. In one embodiment, a gesture-based detection and recognition system is employed with supporting processing performed by a cloud edge platform. In a third aspect, a network multi-stream encoder apparatus is disclosed.

In a fourth aspect, a system for providing user-defined multi-content stream data delivery to users of a content distribution network is disclosed. In one embodiment, the system comprises a hierarchy which includes a local compute platform, micro-edge compute platform, and macro-edge compute platform.

In a fifth aspect, a computer readable apparatus is disclosed.

In a sixth aspect, a consumer premises apparatus configured for interactive stream control is disclosed. In one embodiment, the consumer premises apparatus includes a local compute platform configured to enable detection and creation of hand or other physical gestures by users. The apparatus is configured to communicate with a cloud-based processing (e.g., using machine learning or AI algorithms) for training and implementation of user inputs with low-latency. In a seventh aspect, a method of providing enhanced user interface functionality is disclosed.

In an eighth aspect, a network architecture configured for interactive multi-source user content delivery is disclosed. In one embodiment, local content relevant to a subset of local users is cached at an edge CDN component associated with a micro-edge compute platform.

In a ninth aspect, a "device-less" user interface is disclosed. In one embodiment, the device-less interface comprises a gesture control functionality, along with optional voice-based recognition and control functionality.

In a tenth aspect, a machine-learning (ML) driven network architecture for dynamically modeling individual user behavior and characteristics is disclosed.

In another aspect, a computerized network server apparatus configured to aggregate and distribute digitally rendered content via a fused or single content stream to one or more users of a content delivery network is disclosed. In one embodiment, the computerized network server apparatus includes: a storage entity; at least one network interface; and a digital processor apparatus in data communication with the storage entity and the at least one network interface, the digital processor apparatus configured to run at least one computer program thereon. In one variant, the computer program includes a plurality of instructions which are configured to, when executed: receive first digital content via a first transport mechanism; receive second digital content via a second transport mechanism; generate the composite content stream, the composite content stream comprising at least the first and second digital content; cause provision of the composite content stream to the one or more users; receive control signaling relating to the composite content stream; cause modification of the composite content stream, in accordance with the control signaling, so as to generate a modified composite content stream; and cause provision of the modified composite content stream to the one or more users of the content delivery network.

In another variant, the computerized network server apparatus includes a cloud-based data aggregation and analytics computerized process configured to (i) ingest a plurality of different content from a plurality of different sources, and (ii) encode the plurality of different content using a common encoder process as part of said generation of said fused or single stream.

In a further variant, the control signaling is received via a 5G NR transport in data communication with the computerized network server apparatus via the at least one network interface. In one implementation, the 5G NR transport includes one or more 5G NR slices established to support transmission of the control signaling to the network server apparatus. In one configuration, 5G NR/NR-U (unlicensed) slices for low-latency gesture control are triggered at a serving macro edge cloud/CDN repository in data communication (e.g., co-located with) the multi-access edge cloud platform.

In another aspect, a computerized method of delivering multi-source content to a user via a content distribution network is disclosed. In one embodiment, the computerized method includes: utilizing at least one air interfaces using unlicensed or quasi-licensed spectrum to backhaul control data from a user premises to a gateway apparatus; backhauling the gateway apparatus to a cloud-based processing and aggregation entity, the cloud-based processing and aggregation entity configured to control aggregation of a plurality of digitally rendered content from respective ones of a plurality of sources based at least on the control data; generating a fused or single media stream based at least on the control data, the fused or single media stream comprising the plurality of digitally rendered content; and streaming the generated fused or single media stream to a computerized device at the user premises via a streaming protocol.

In one variant, the backhauling of the gateway includes backhauling a gateway disposed at an edge portion of the content distribution network.

In another variant, the backhauling of the control data includes backhauling using a 5G NR (New Radio) low-latency channel via at least a mobile network operator (MNO) network in data communication with the content distribution network. In yet another variant, the backhauling of the control data includes backhauling using a low-latency channel via at least a standalone (SA) 5G NR/NR-U network.

In a further aspect, a method of controlling delivery of content data, the controlling via a user interface is disclosed. In one embodiment, the method includes: receiving at cloud processing entity data relating to a gesture of a user, the user gesture observed by an optical or infrared imaging system, the obtained data relating to the user gesture; recognizing, based at least on the received data, the user gesture; associating the recognized gesture with a control function; and causing transmission of control data to a data encoding process, the data encoding process configured to control the delivery of content based at least on the control function.

In another embodiment, the method includes receiving at the cloud processing entity the gesture data relating to a gesture of a user, the data derived from high-density point cloud data (e.g., a 3D output from a point-cloud data generation process).

In one variant the recognizing the user gesture includes utilizing a user skill specification maintained by the cloud processing entity.

In another variant, the method further includes receiving audio input from the user, the audio input comprising digitized data relating to a speech command, the digitized data received via a low-latency wireless link between a computerized device associated with the user and the cloud processing entity, the low-latency link configured to enable preservation of a prescribed timing relationship or requirement between an utterance of the speech command and implementation of a control function designated by the speech command.

In a further variant, the method includes receiving audio input from the user, the audio input comprising digitized data relating to speech to be integrated with at least a portion of the content data, the digitized data received via a low-latency wireless link between a computerized device associated with the user and the cloud processing entity; and wherein the method further includes transmitting the received speech data to the data encoding process for including of at least a portion of the speech data within one of a plurality of content streams; and causing delivery of the plurality of content streams to the user as an aggregated content stream.

In a further aspect, a skills platform and related architecture is disclosed. In one embodiment, the skills platform utilizes an "open" model accessible by e.g., developers, thereby enabling broad contribution/development and update/modification. In one variant, the skills associated with the platform and architecture differ in capability with respect to traditional remote control or voice control functionality, and are user-definable or "trainable" so as to be able to adapt to a particular user's physical characteristics, desires, etc. For instance, in one implementation, disabled persons may define skills within their own specific capabilities, which may involve different portions or modalities of their body (e.g., keyed off movement or formation of shapes of different parts of their body, whether alone or in combination with either (i) other parts of their body (e.g., eye movement), and/or audible speech or utterances. Temporal sequences of the same or different actions may also be defined, so as to enable user-specific encoding of commands (especially useful for those with very limited physical capabilities). In this fashion, persons with disabilities not be able to use existing types of control functions (e.g., the voice control) can rapidly adapt their premises system to their specific physical capabilities profile. These profiles may also be uploaded to the cloud to use as templates for other similar disabled persons (e.g., others with a common affliction).

In yet a further aspect, a multi-tier hierarchical architecture for content aggregation, control and delivery is disclosed. In one embodiment, a multi-level hierarchy is utilized, including: (i), local-edge (e.g., at the client device), and (ii) a micro-cloud level, and (iii) a macro-cloud level. The micro-cloud tier is located in one implementation more locally (topologically) to a specific subset of served local-edge premises, while the macro-cloud tier is used to support two or more micro-edge cloud nodes or platforms.

In one implementation, gesture recognition processing is performed at the local-edge tier. In another implementation, gesture processing is performed at the micro- or macro cloud-level.

In another aspect of the disclosure, methods and apparatus for maintaining user privacy while enabling real-time content fusion and processing are disclosed. In on embodiment, the aforementioned system architecture utilizes real-time processing of constituent video feeds, and hand gesture input type is inferred locally at the premises device (local platform). In one such variant, only the control command is sent to the cloud processing entity of the architecture to encode a new video stream. In one implementation, the hand gestures are sent only as e.g., hashed control messages to the cloud (no actual video or image data relating to the captured hand gesture is transmitted to the cloud), thereby allowing for enhanced user privacy aspects in that control message data is "non-privacy invasive."

These and other aspects shall become apparent when considered in light of the disclosure provided herein.

BRIEF DESCRIPTION OF THE DRAWINGS

FIG. 7 is a functional block diagram illustrating one embodiment of an edge platform apparatus for use in delivering integrated content to users according to the present disclosure.

Figure 1:
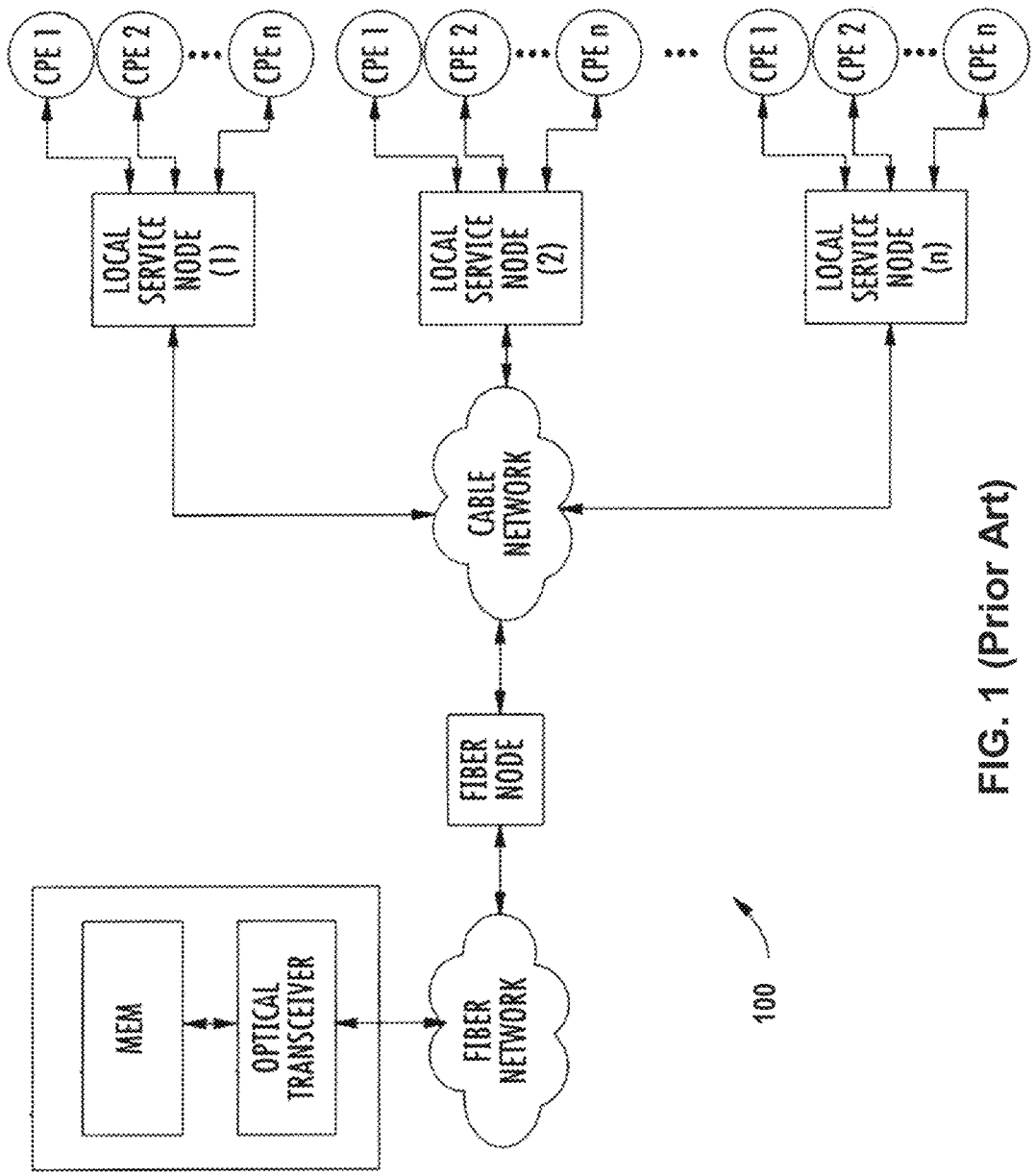
FIG. 1 is a functional block diagram illustrating a typical prior art managed (e.g., cable) content delivery network architecture.

All figures © Copyright 2018-2019 Charter Communications Operating, LLC. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "C-Band" refers without limitation to frequency spectrum in the range of 4.0 GHz to 8.0 GHz, including for instance the 3.7 to 4.2 GHz portion ostensibly designated by the U.S. FCC for next-generation terrestrial and mobile broadband, as well as the 5.725-5.875 GHz unlicensed band, and others.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1. 3, January 2018, incorporated herein by reference in its entirety, and any related documents or subsequent versions thereof.

As used herein, the term "central unit" or "CU" refers without limitation to a centralized logical node within a wireless network infrastructure. For example, a CU might be embodied as a 5G/NR or NR-U gNB Central Unit (gNB-CU), which is a logical node hosting RRC, SDAP and PDCP protocols of the gNB or RRC and PDCP protocols of the en-gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle telematics or infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like. Such programs may also include development environments such as e.g., Nvidia CUDA, OpenCV, OpenGl, OpenWrt, and may also include containerized applications or environments (e.g., Docker-based systems), as well as hypervisors and virtual machine (VM) environments.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "IoT device" refers without limitation to electronic devices having one or more primary functions and being configured to provide and/or receive data via one or more communication protocols. Examples of IoT devices include security or monitoring systems, appliances, consumer electronics, vehicles, infrastructure (e.g., traffic signaling systems), and medical devices, as well as receivers, hubs, proxy devices, or gateways used in association therewith.

As used herein, the term "IoT network" refers without limitation to any logical, physical, or topological connection or aggregation of two or more IoT devices (or one IoT device and one or more non-IoT devices). Examples of IoT networks include networks of one or more IoT devices arranged in a peer-to-peer (P2P), star, ring, tree, mesh, master-slave, and coordinator-device topology.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G/4.5G LTE, WiMAX, VoLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory such as XPoint, HBM/HBM2, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, GPUs, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, "transmit" and "transmission" of data include without limitation transmitting packetized digital data, whether in wired or wireless fashion. Wireless transmission of data may be accomplished via various means, including via interfaces using IEEE Std. 802.11 (e.g., WLAN Wi-Fi) or 3GPP-based (e.g., 3G, 4G LTE, LTE-U, LTE-LAA, LTE-A, 4G/4.5G/5G) protocols. Such transmission allows a client device (e.g., smartphone, laptop, tablets) to download or stream the data from the transmitting entity.

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR/NR-U, C-Band (e.g., 3.7-4.2 GHz) analog cellular, CDPD, satellite systems, millimeter wave or microwave systems, acoustic, and infrared (i.e., IrDA).

As used herein, the term "xNB" refers to any 3GPP-compliant node including without limitation eNBs (eUTRAN) and gNBs (5G NR).

Overview

In one exemplary aspect, the present disclosure provides improved architectures, methods and apparatus for providing an aggregated or "fused" multi-source video stream which, inter alia, leverages existing managed network (e.g., cable network) infrastructure, as well as highly stable and low-latency infrastructure (e.g., 3GPP 5G/NG-RAN) for control and upload content feeds. The disclosed architectures, methods and apparatus enable media aggregation between two or more different media streams or sources (e.g., network programming, OTT content, and/or personal/user content or even local content) via a single media data stream delivered to a user in e.g., an overlaid or superimposed display configuration. Real-time user control and fusion is provided by virtue of the low-latency "side" channel or backhaul which operates independently of the traditional managed network delivery infrastructure, thereby allowing for a variety of features including user real-time interactivity and collaboration, as well as gesture control.

In one particular implementation, the aforementioned aggregation and scaling of the multiple media or content streams into a fused single stream enables precise positioning of gesture control logic (accessible via the exemplary "side" channel in the UL) at a "macro edge-CDN" or MEC, or even at a regional data center/content repository. Smooth (low-latency and responsive) functionality in control and delivery of the content is achieved via caching of the content (regionally) proximate or local to the MEC function, and high-popularity content may also be locally cached to facilitate reduced latency and enhanced user experience. In some configurations, "multi-view" or composite or fused content is streamed as a single encoded video stream, wherein traditional CDN content and context-specific (e.g., area- or geography-based) content are delivered concurrently, with the ability for users to customize the delivery (such as by inclusion or exclusion of e.g., news bars, weather information, time information, etc.). The local or context-specific content is generally a less rich content, and accordingly has little or no impact on the encoding of the fused stream, since such content in those parts of the multi-view video stream is more static and region/area-oriented in nature.

Additionally, the disclosed architectures, methods and apparatus advantageously conserve downlink bandwidth (e.g., bandwidth associated with in-band or DOCSIS QAMs in an MSO cable network) through delivery of the fused or aggregated content stream which has been encoded within the delivery network infrastructure (as opposed to parallel delivery of multiple individual streams to a common user).

In one embodiment, a Hybrid Fiber Coax (HFC) plant infrastructure and extant protocols (e.g., in-band or DOCSIS) are used as bases for downlink provision of network and other content or programming (e.g., OTT); in conjunction, ultra-low latency and high data rate services (e.g., 5G NR services) are used for uplink or backhaul, including user UI-based commands, provision of user content (e.g., user-generated content generated from their mobile device, or CPE at their premises), and other time-critical functions such as content synchronization. In one variant, the low-latency 5G NR backhaul is provided via unlicensed or quasi-licensed spectrum and associated infrastructure operated and managed by the MSO. Additionally, an application processing (AP) apparatus is provided which, in various embodiments, uses control signaling (e.g., user input) to enable user interaction with the aggregated content. The AP in various implementations may be an "edge," "cloud," or "fog" based entity for enhanced efficiency and reduced latency.

In one implementation, various feedback mechanisms may also be utilized by the user premises apparatus and supporting network infrastructure to enable the client application to "learn" from the user's activities in order to update a user-specific profile, and generate more finely-tuned and cogent recommendations (e.g., "learned skills"). For instance, artificial intelligence and machine learning operative within the cloud are used in various exemplary implementations to automatically suggest actions to the user or change settings based on user input data, as well as identifying commonalities across multiple different customers or sites served by the network operator or service provider.

Detailed Description of Exemplary Embodiments

Exemplary embodiments of the apparatus and methods of the present disclosure are now described in detail. While these exemplary embodiments are described in the context of a managed network (e.g., hybrid fiber coax (HFC) cable) architecture having a service provider (e.g., multiple systems operator (MSO)), digital networking capability, IP delivery capability, a plurality of client devices, and wireless access nodes (e.g., gNBs or CBSDs) associated there with or supported at least in part thereby, the general principles and advantages of the disclosure may be extended to other types of networks and architectures that are configured to deliver digital data (e.g., text, images, games, software applications, video and/or audio), whether managed or unmanaged. Such other networks or architectures may be broadband, narrowband, wired or wireless, or otherwise, the following therefore being merely exemplary in nature.

It will also be appreciated that while described generally in the context of a network providing service to a customer or consumer or end user or subscriber (e.g., residential, within a prescribed service area, venue, or other type of premises) end user domain, the present disclosure may be readily adapted to other types of environments including, e.g., commercial/enterprise (e.g., businesses) and government/military applications. Myriad other applications are possible.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

Finally, while described primarily in terms of 3GPP 5G NR (New Radio) technology for, inter alia, provision of the stable, low-latency backhauls or uplinks, the various aspects of the present disclosure are in no way so limited, and in fact other types of bearers or technologies which provide suitably stable and low-latency capability may be substituted, whether wireless or wireline.

Other features and advantages of the present disclosure will immediately be recognized by persons of ordinary skill in the art with reference to the attached drawings and detailed description of exemplary embodiments as given below.

Service Provider Network—

Figure 3:
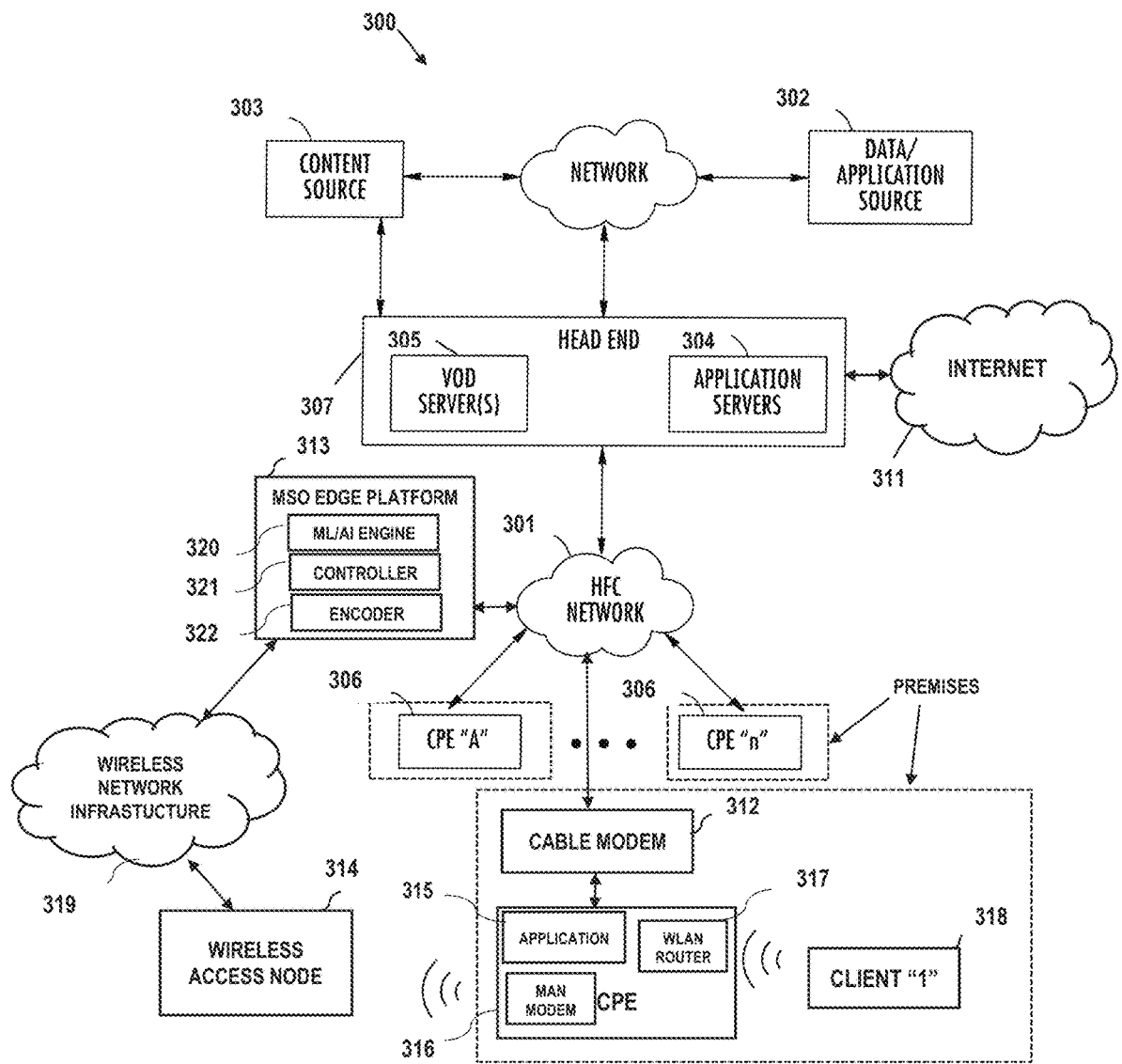
FIG. 3 is a functional block diagram illustrating an exemplary embodiment of a generalized hybrid fiber network configuration useful with various aspects of the present disclosure.

FIG. 3 illustrates a typical service provider network configuration useful with the content aggregation/integration functionality and supporting 5G-based wireless network(s) described herein.

The exemplary service provider network 300 is used in one embodiment of the disclosure to provide downstream content delivery, as well as backbone and Internet access from the service provider's (or another operator's) wireless access nodes; e.g., CBSDs, xNBs (e.g., 5G NR gNBs (e.g., NR-U) base stations 314), MAN modems (e.g., CBRS FWA apparatus) or Wi-Fi APs 317, operated or maintained by the service provider or its customers/subscribers, including cases where the subscriber leases the device for use), one or more stand-alone or embedded cable modems (CMs) 312, in data communication therewith, or even third party access points accessible to the service provider via, e.g., an interposed network such as the Internet 311 (e.g., with appropriate permissions from the access node owner/operator/user). As discussed in greater detail elsewhere herein, the exemplary access nodes 314 include the capability of communication with served nodes such as the CPE 316 discussed infra for, inter alia, low-latency and stable backhaul for user control plane and user plan data (e.g., control signaling and/or upload of locally generated video data). Herein lies a salient aspect of the exemplary configuration of FIG. 3; i.e., a generally ubiquitous or pervasive availability to low-latency wireless backhaul from the user (whether at their primary premises or another location) to enable real-time content control and aggregation.

As a brief aside, NG-RAN or "NextGen RAN (Radio Area Network)" is part of the 3GPP "5G" next generation radio system. 3GPP is currently specifying Release 16 NG-RAN, its components, and interactions among the involved nodes including so-called "gNBs" (next generation Node B's or eNBs). NG-RAN provides very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

Likewise, Citizens Broadband Radio Service (CBRS) spectrum in the 3550-3700 MHz (3.5 GHz) band is available for mobile broadband and other commercial users. The CBRS is unique, in that it makes available a comparatively large amount of spectrum (frequency bandwidth) without the need for expensive auctions, and without ties to a particular operator or service provider. Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. The three tiers are coordinated through one or more dynamic Spectrum Access Systems (SAS).

The FCC's three-tiered spectrum sharing architecture utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) can only operate under authority of a centralized Spectrum Access System (SAS). Rules are optimized for small-cell use, but also accommodate point-to-point and point-to-multipoint, especially in rural areas.

Under the FCC system, the standard SAS includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. These functions are provided for by, inter alia, an incumbent detection (i.e., environmental sensing) function configured to detect use by incumbents, and an incumbent information function configured to inform the incumbent when use by another user occurs. An FCC database is also provided, such as for PAL license validation, CBSD registration, and other functions.

In terms of spectral access, CBRS utilizes a time division duplex (TDD) multiple access architecture.

It will also be appreciated that C-Band based solutions may be used consistent with the present disclosure, whether alone or in conjunction with other bands such as CBRS or NR/NR-U. For instance, the C-Band 3.7-4.2 GHz designated by the U.S. FCC for next-generation terrestrial and mobile broadband may present a readily accessible connectivity means for e.g., new service enablement. In one such implementation, 3GPP 5G NR technology is utilized as the basis of such solutions for, inter alia, ubiquity of connectivity and service provision, although other technologies such as e.g., Multefire may be utilized as well.

Returning again to FIG. 3, and as described in greater detail subsequently herein with respect to FIGS. 3A and 3B, one or more MSO network "edge" cloud controllers 321 are utilized in conjunction with CPE-based controller logic 315 for, inter alia, (i) aggregation of content data, transmission of streaming media, analytics, and control functionality (e.g., gesture detection and processing) and machine learning (ML)/AI, and (ii) utilization of the wireless network access nodes 314 at least partly by the MSO so as to optimize delivery of content to the target CPE 316 from the network. As shown in FIG. 3, the edge entity 313 includes the controller 321 and a corresponding encoder 322 used to facilitate encoding of composite or aggregated content streams for delivery to the requesting client(s) and their CPE 316.

It will be appreciated by those of ordinary skill given the present disclosure that while exemplary embodiments presented herein utilize encoding processes (e.g., for content media stream fusion) being disposed at edge portions or components of the MSO network (e.g., the "MEC" described in greater detail subsequently herein), other approaches may be used consistent with the present disclosure. Specifically, for low-latency and seamless ("smooth") user experience via the UI, content aggregation and encoding is performed at the MEC. This approach also advantageously affords the ability to better control regional "popular" content and data stored in local (e.g., edge) caches, such as for example regional news, sports, weather, road conditions, etc., without having to source it from sources closer to the network core (and associated latency and storage redundancy associated therewith).

However, in scenarios where the requirements for "smooth" low-latency operation of the control/control feedback are not as critical or constrained, such aggregation and encoding (and even caching) operations can be performed in higher-tier nodes or locations within the topology; e.g., in one or more regional CDNs. This approach carries, inter alia, the advantage of permitting "early entry" within the processing and delivery pipeline by using the regional data center (RDC) with its processing assets and resources as an initial compute base, while still enabling sufficient levels of low-latency control the in access network in both fixed/mobile-wireline/wireless delivery contexts.

As opposed to an unmanaged network, the managed service-provider network 300 of FIG. 3 advantageously allows, inter alia, control and management of a given user's access (such user which may be a network subscriber, or merely an incidental/opportunistic user of the service) via the wireless access node(s) 314 and the CPE 316, including imposition and/or reconfiguration of various access "rules" or other configurations applied to the wireless access nodes. For example, the service provider network architecture 300 allows components at a served premises or venue of interest (e.g., CBSDs, gNBs (e.g., NR-U), FWAs, Wi-Fi APs and any supporting infrastructure such as routers, switches, etc.) to be remotely and dynamically reconfigured by the network MSO, based on e.g., prevailing operational conditions in the network, changes in user population and/or makeup of users at the premises/venue, or business models (e.g., to maximize profitability or provide other benefits such as enhanced user experience, as described infra).

In certain embodiments, the service provider network 300 also advantageously permits the aggregation and/or analysis of subscriber- or account-specific data (including inter alia, particular CPE devices 316 associated with such subscriber or accounts) as part of the provision of services to users under the exemplary delivery models described herein (including e.g., user-specific profiles and "skills" associated therewith, as described in greater detail below). As another example, device-specific IDs (e.g., MAC address or the like) can be cross-correlated to MSO subscriber data maintained at e.g., the network head end(s) 307 so as to permit or at least facilitate, among other things, (i) device authentication; (ii) correlation of aspects, use cases or applications to particular subscriber geographics or installation features, such as for logical grouping of CPE devices of two or more discrete subscribers (or premises thereof) for purposes of e.g., aggregation under a common "host" xNB, controller 321, or encoding server 322. Moreover, device profiles for particular CPE devices can be maintained by the MSO, such that the MSO (or its automated proxy processes) can model the subscriber-associated device for video, processing, and/or 5G wireless capabilities.

The wireless access nodes 314 can be disposed at or distant from the service location(s) (e.g., areas, premises or venue(s) of interest) or more broadly, and can be coupled to the bearer managed network 300 (FIG. 3) via, e.g., a cable modem termination system (CMTS) and associated local DOCSIS cable modem (CM) 312, a wireless bearer medium (e.g., a millimeter wave system—not shown), a fiber-based system such as FiOS or similar, a third-party medium which the managed network operator has access to (which may include any of the foregoing), or yet other means. In some embodiments, third-party MNO infrastructure may be used for wireless backhaul, whether alone or in combination with MSO-based backhaul (e.g., a 5G NR gNB operated by an MNO may be used for connectivity to the MSO edge node 313, as may an MSO-operated CBSD.

Notably, through aggregation of the various wireless technologies at the site via a gateway 367 (see FIGS. 3A and 3B), the need for backhaul can be condensed into a single or limited number of technologies, and is adaptable to the specifics of the given site (e.g., whether or not there is an extant cable or fiber drop, whether cellular/data coverage by an MNO (e.g., a cellular service provider or CSP), whether or not the premises has an FWA and corresponding CBSD infrastructure is within range, etc.).

The various components of the exemplary embodiment of the network 300 generally or nominally may include (i) one or more data and application origination sources 302; (ii) one or more content sources 303, (iii) one or more application distribution servers 304; (iv) one or more video-on-demand (VOD) servers 305, (v) client devices 306, (vi) one or more edge nodes 313 with controllers 321 (which may be placed more locally as shown or in the headend or "core" portion of network), (vii) one or more cable modems 312, 313, and/or (viii) one or more access nodes 314 (which may include for example 3GPP-compliant 5G NR gNodeB or CBRS CBSD functionality as described elsewhere herein). The application server(s) 304, VOD servers 305 and client device(s) 306 are connected via a bearer (e.g., HFC) network 301 in this example. A simple architecture comprising one of each of certain components 302, 303, 304, 307, 313, 314 is shown in FIG. 3 for simplicity, although it will be recognized that comparable architectures with multiple origination sources, distribution servers, VOD servers, controllers, wireless networks and nodes, and/or client devices (as well as different network topologies) may be utilized consistent with the present disclosure.

It is also noted that cable network architecture is typically a "tree-and-branch" structure, and hence multiple tiered xNB or CBSD access nodes 314 (and other components) may be linked to each other or cascaded via such structure. As noted above, the architecture may also utilize MNO-managed access points (e.g., 5G NR gNBs), whether in SA (standalone) or NSA (non-standalone) architecture, for provision of the low-latency high stability uplink and related services described herein. While some variants of the present disclosure contemplate interaction between the 5G NR uplink components and the combination encoding described below, other variants make use of a "non-aware" or nominal 5G or similar link; i.e., one which has the desired performance/latency attributes, but which is not controlled by or involved directly in the overlay or combination processing other than merely carrying the user-plane upload data.

Figure 3A:
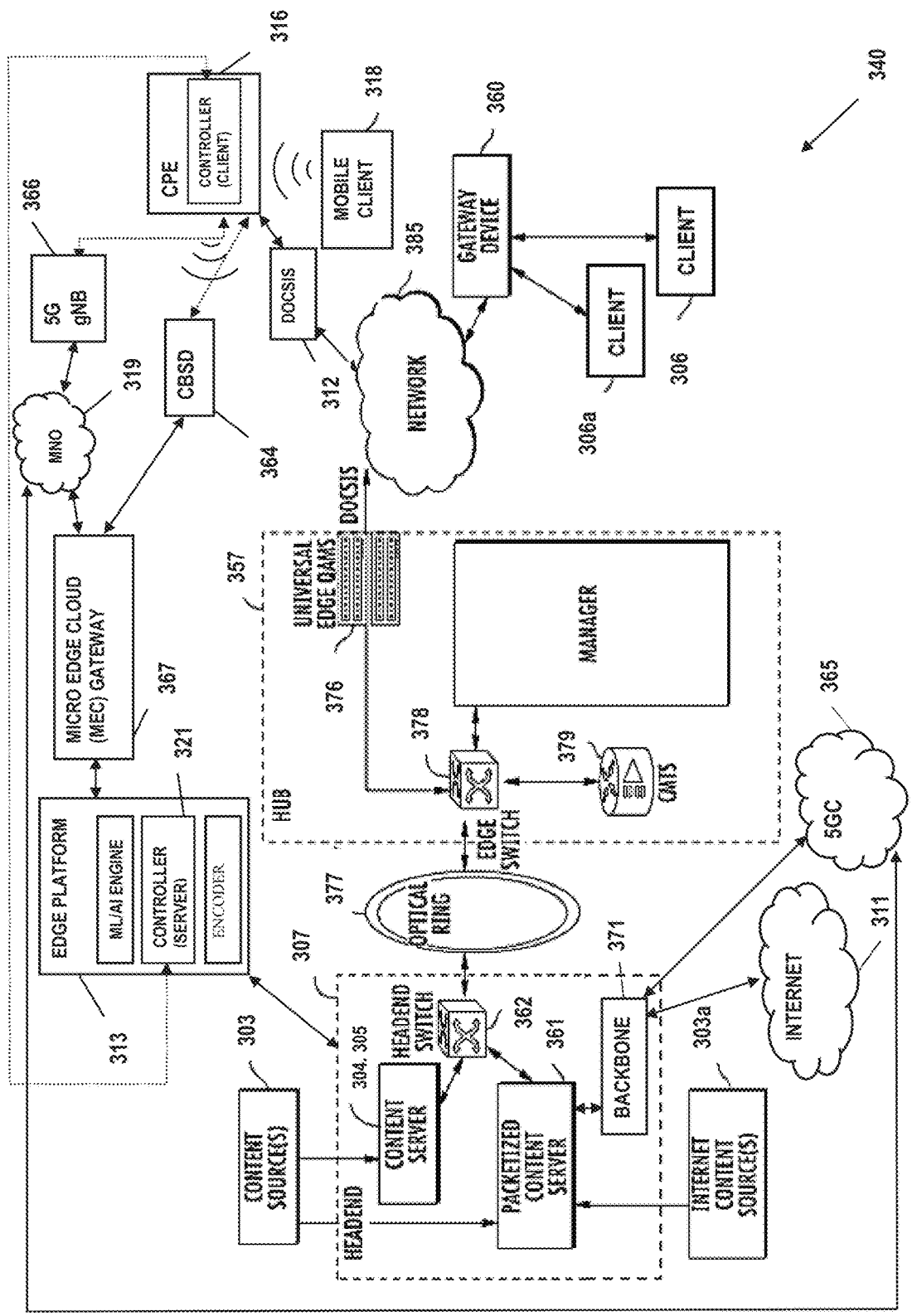
FIG. 3A is a functional block diagram of an exemplary packetized content network implementation of the generalized architecture of FIG. 3.

FIG. 3A illustrates an exemplary high-level MSO network architecture for the delivery of packetized content (e.g., encoded digital content carried within a packet or frame structure or protocol) that may be useful with the various aspects of the present disclosure. In addition to on-demand and broadcast content (e.g., live video programming), the system of FIG. 3A may deliver Internet data and OTT (over-the-top) services to the end users (including those of the access nodes 314) via the Internet protocol (IP) and TCP, although other protocols and transport mechanisms of the type well known in the digital communication art may be substituted. As described elsewhere herein, the present disclosure contemplates delivery of one or more aggregated data streams to a given user or premises, whether by the managed network infrastructure (e.g., the MSO HFC infrastructure), and/or the wireless infrastructure (e.g., the "fronthaul" of premises FWA backhauled by an MSO or third party CBSD, or other approach or technology).

Figure 2:
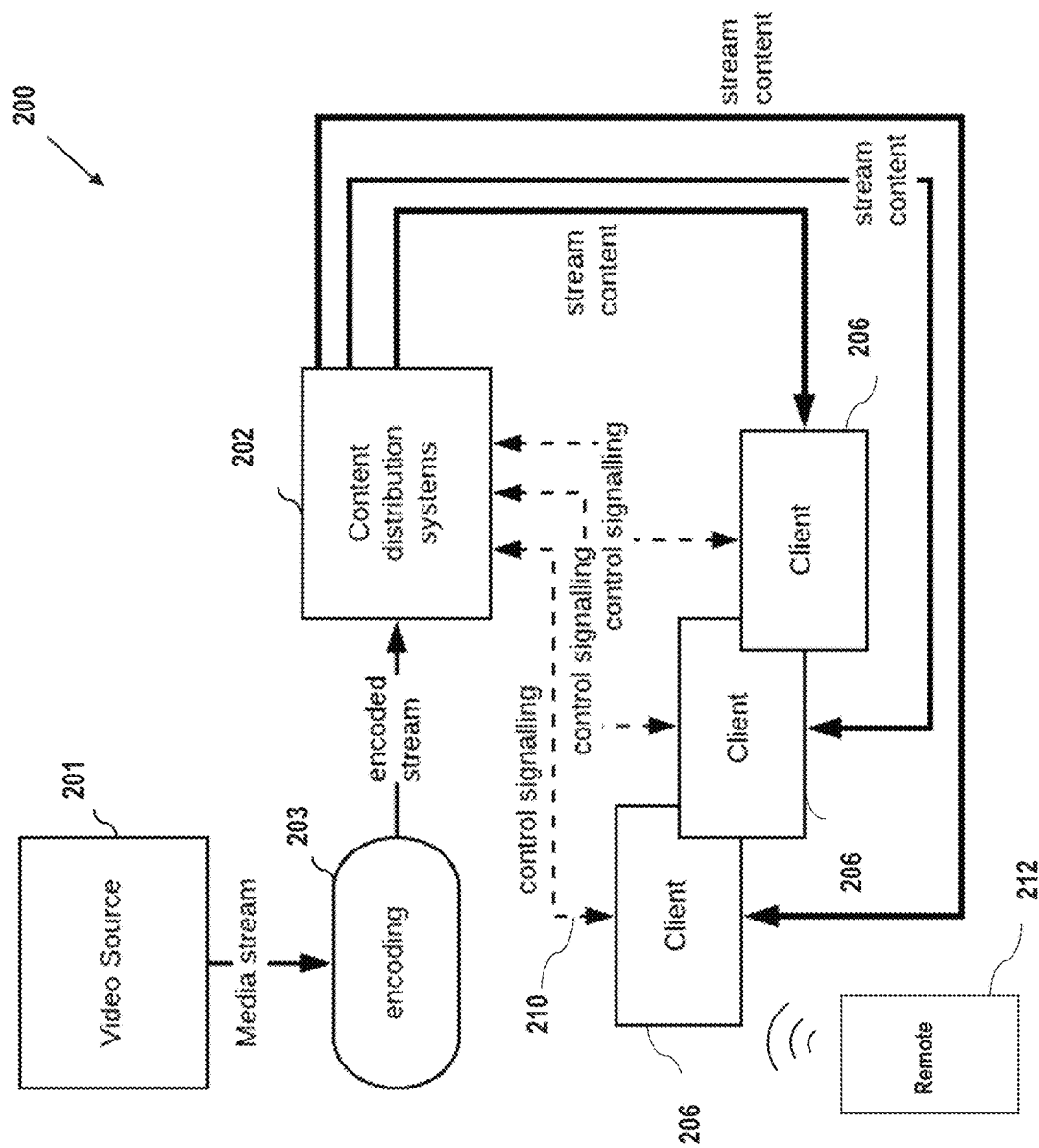
FIG. 2 is a simplified functional block diagram of a typical prior art content encoding and distribution architecture.

The network architecture 340 of FIG. 2A generally includes one or more headends 307 in communication with at least one hub 357 via an optical ring 377. The distribution hub is able to provide content to various user/client devices 306, and premises gateway devices 360 as applicable, via an interposed network infrastructure 385. User devices such as 3GPP-compliant UE 318 (e.g., smartphones or other mobile devices) may be in direct communication with the access nodes 314 (whether MSO or MNO managed), and the CPE 316 (e.g., via WLAN or other local networking technology) as shown.

Various content sources 303, 303a are used to provide content to content servers 304, 305 and origin servers 361. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK," which is incorporated herein by reference in its entirety. Alternatively, content may be received from linear analog or digital feeds, as well as third party content sources (e.g., third party content streams). Internet content sources 303a (such as e.g., a web server) provide Internet content to a packetized content origin server(s) 361. Other IP content may also be received at the origin server(s) 361, such as voice over IP (VoIP) and/or IPTV content. As discussed in greater detail below, content may also be received from subscriber and non-subscriber devices (e.g., a PC or smartphone-originated user made video) and included on the downlink to a given CPE 316 (as well as that CPE or an associated device originating similar content itself, as described elsewhere herein).

The centralized media server(s) 361, 304 located in the headend 307 may also be replaced with or used in tandem with (e.g., as a backup) to hub media servers (not shown) in one alternative configuration. By distributing the servers to the hub stations 357, the size of the fiber transport network associated with delivering VOD services from the central headend media server is advantageously reduced. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

Moreover, it will be appreciated that the edge cloud 313 and MEC gateway 367 may also be incorporated into a hub 357 if desired, to inter alia further facilitate consolidation of infrastructure, and place the MEC gateway/edge cloud closer to the client premises/CPE being served. As previously noted, the present disclosure contemplates multi-tier or hierarchical architectures including use of both macro- and micro-edge cloud entities, such that the functions of the illustrated gateway 367 and edge platform 313 may be disposed at either or distributed across them so as to optimize various aspects of system performance.

It will also be recognized that a heterogeneous or mixed server approach may be utilized consistent with the disclosure. For example, one server configuration or architecture may be used for servicing cable, satellite, etc., subscriber CPE-based session requests (e.g., from a user's DSTB or the like), while a different configuration or architecture may be used for servicing streaming CPE or mobile client requests. Similarly, the content servers 361, 304 may either be single-purpose/dedicated (e.g., where a given server is dedicated only to servicing certain types of requests), or alternatively multi-purpose (e.g., where a given server is capable of servicing requests from different sources).

The network architecture 340 of FIG. 2A may further include a legacy multiplexer/encrypter/modulator (MEM; not shown). In the present context, the content server 304 and packetized content server 361 may be coupled via a LAN to a headend switching device 362 such as an 802.3z Gigabit Ethernet (or "10G/10 GbE") device. For downstream delivery via the MSO infrastructure (i.e., QAMs), video and audio content is multiplexed at the headend 307 and transmitted to the edge switch device 378 (which may also comprise an 802.3z Gigabit Ethernet device) via the optical ring 377.

In one exemplary content delivery paradigm, MPEG-based video content (e.g., MPEG-2, H.264/AVC or H.265/HEVC) may be delivered to user IP-based client devices (e.g., CPE 316) over the relevant physical transport (e.g., DOCSIS or other channels such as in-band QAM); that is as MPEG-over-IP-over-MPEG. Specifically, the higher layer MPEG or other encoded content may be encapsulated using an IP network-layer protocol, which then utilizes an MPEG or other packetization/container format of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's DSTB or other receiver device (e.g., CPE 316) for viewing on the television, and also as packetized IP data over the DOCSIS QAMs to the user's PC or other IP-enabled device via the user's cable modem 312. Delivery in such packetized modes may be unicast, multicast, or broadcast.

Individual client devices such as cable modems 312 and associated end-user devices 306, 316 of the implementation of FIG. 3A may be configured to monitor the particular assigned RF channel (such as via a port or socket ID/address, or other such mechanism) for IP packets intended for the subscriber premises/address that they serve. The IP packets associated with Internet services are received by the edge switch 378, and forwarded to the cable modem termination system (CMTS) 379 (which may include for example 3GPP-compliant 5G NR functionality as described elsewhere herein). The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the client devices. The IP packets are typically transmitted on RF channels that are different than the "in band" RF channels used for the broadcast video and audio programming, although this is not a requirement. As noted above, the premises devices such as cable modems 312 and CPE 316 are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 376. According to this embodiment, all of the content is delivered on DOCSIS channels, which are received by a premises gateway 360 or cable modem 312, and distributed to one or more respective client devices/UEs 306, 316, 318 in communication therewith.

In one implementation, the cable modem (CM) 312 and CPE 316 shown in FIG. 3A services an area which may include a prescribed premises or venue, such as an apartment building, conference center, enterprise, or hospitality structure (e.g., hotel). In parallel (or in the alternative), the premises includes one or more WLAN (e.g., Wi-Fi) nodes or routers 317 for WLAN access (e.g., within 2.4 GHz ISM band), or a 3GPP "small cell" gNB, each of the foregoing backhauled by e.g., the DOCSIS modem 312. In one implementation, the served premises also includes a CBRS node 364 for CBRS-band (3.55-3.7 GHz) access, and a 5G NR-U gNB 366, either or both acting as the access node 314 of FIG. 3. Note that the gNB 366 and CBSD 364 may also be disposed away from the premises (but within wireless distance thereof, such as via an installed CBRS FWA or other modem serving the premises). Notably, in some configurations, the CPE or client devices communicating with the access nodes 314 (e.g., CBSD 364 or gNB 366) as described in greater detail subsequently herein, can utilize either RAT (3GPP with the gNB or CBRS).

In parallel with (or in place of) the foregoing delivery mechanisms, the MSO backbone 371 and other network components can be used to deliver packetized content to the user's mobile client device 318 and even the wireless-enabled CPE 316, via it's MAN modem in FIG. 3) via non-MSO networks. For example, so-called "OTT" content (whether tightly coupled or otherwise) can be ingested, stored within the MSO's network infrastructure, and delivered to the user's mobile device via an interposed ISP (Internet Service Provider) network and public Internet 311 (e.g., at a local coffee shop, via a Wi-Fi AP connected to the coffee shop's ISP via a modem, with the user's IP-enabled end-user device utilizing an Internet browser or MSO/third-party app to stream content according to an HTTP-based approach). Notably, so long as the user has a low-latency connection back to the MEC gateway 367 and hence the edge platform 313 at their location (as well as e.g., a device capable of control inputs as described elsewhere herein), various delivery and content aggregation/control mechanisms can be provided to a user in a mobile or non-premises context (i.e., when they are away from their primary premises, such as at a hotel while traveling).

The architecture of FIG. 3A also includes an MNO network 314 which may be used consistent with the various aspects of the present disclosure. As shown, the MNO network may provide mobile wireless (e.g., cellular data, via 5G NR gNB operated by the MNO) service to the CPE 316 or mobile user devices 318. It will be appreciated that in one variant, the MEC gateway 367 may be integrated with the gNB 366 or CBSD 364 in support of the aggregation and processing and detection functions at or near the MSO customer site, with the edge cloud/platform 313 disposed at an MSO site (or virtually controlled by the MSO). In this regard, the MSO and one or more MNOs (and/or ISPs) may cooperate to establish the necessary low-latency high bandwidth links "end to end" from the client device(s) 306, CPE 316, and/or gateway 360 to the edge cloud with controller 321, such as via cooperative agreements. Moreover, the MNO and MSO may cooperate on establishment of one or more 5G NR network slice, such as to e.g., allocate one or more dedicated channels or bearers (and other interposed infrastructure) to meet latency requirements. Placement of the controller 321 and its associated edge computing capability (see exemplary configuration of FIG. 3B) at or near the edge (such as in a gNB or other peripheral node such as a CBSD) may also be used to in some cases reduce latency, in that the collected and aggregated control (e.g., gesture) data and/or video data need not be backhauled to the 5GC (or MSO core), but rather may be routed directly to the processing and control functionality at the "edge" controller 321 via 5G infrastructure such as an UPF or packet gateway.

In another embodiment of the architecture 300, the extant MSO infrastructure may itself be configured for 5G NR capability and waveform carriage (including observance of latency and QoS requirements), thereby providing the low-latency (and high bandwidth) backhaul for control and other data from the served premises to the designated edge cloud entity. See e.g., the exemplary methods and apparatus described in co-owned and co-pending U.S. patent application Ser. No. 16/216,835 filed Dec. 11, 2018 and entitled "Apparatus and Methods for Integrated High-Capacity Data and Wireless Network Services" incorporated herein by reference in its entirety.

Figure 3B:
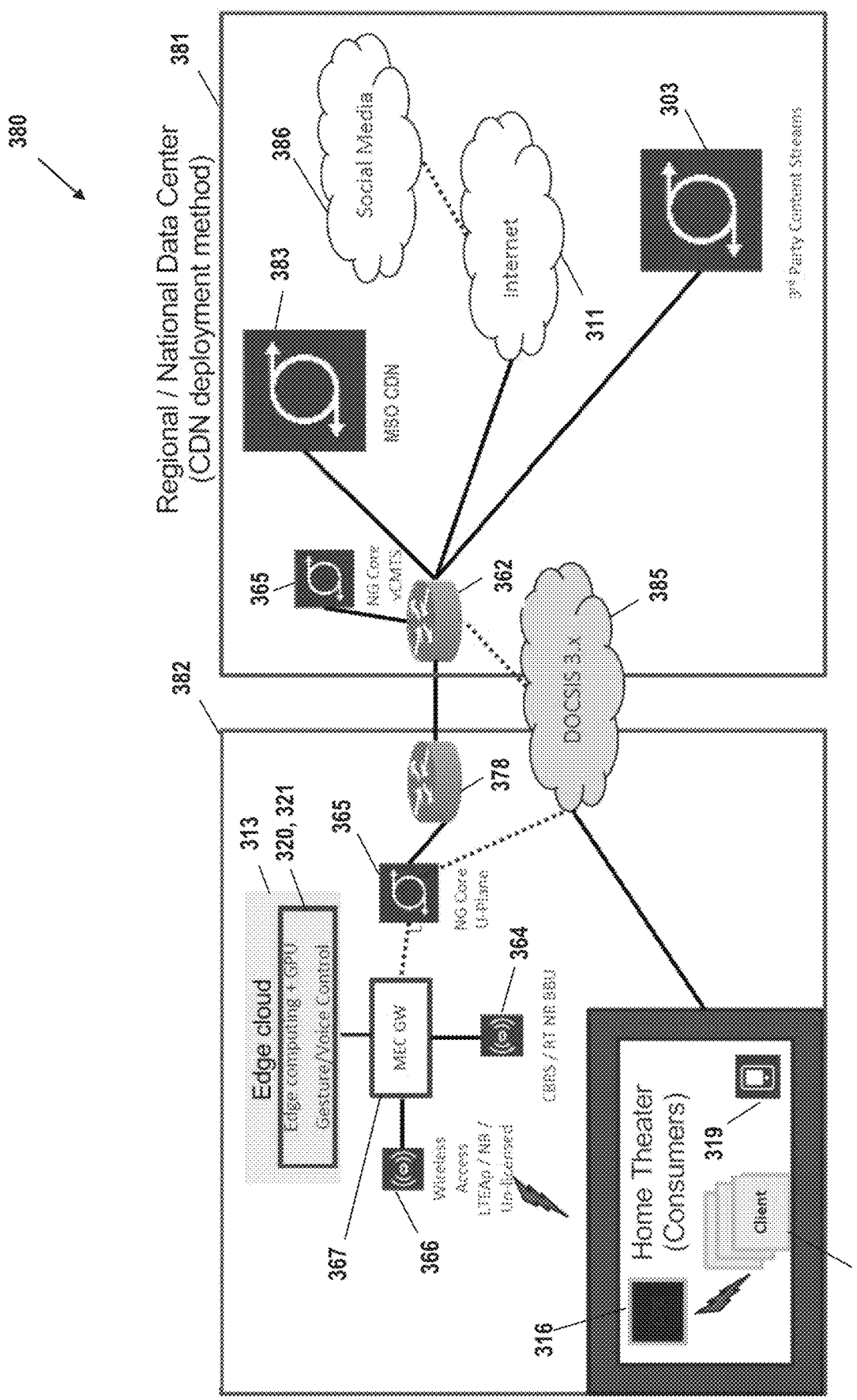
FIG. 3B is a functional block diagram of a particular implementation of the architecture of FIGS. 3 and 3A, according to the present disclosure.

Referring now to FIG. 3B, an exemplary embodiment of a content distribution architecture 380 adapted for fixed/mobile convergence, and aggregating or integrating content/data elements, according to the present disclosure is described in detail.

The network architecture 370 of FIG. 3B generally includes a regional/national data center 381 which may be combined or subsumed within an MSO headend 307 and a local or edge node 382. The regional/national data center 381 includes an MSO content distribution network (CDN) 383 and receives content from the various content source(s) 303, 311, 386 as shown in FIG. 3B. In one variant, the CDN comprises a plurality of proxy servers located at distributed points throughout the MSO network, although other configurations are possible.

The content of FIG. 3B may be received from linear analog or digital feeds, as well as various third party content sources; for example, the content can include live feeds, social media feeds, third party customized background scenes, local content or programming, and the like.

Also shown as part of the RNDC 381 is a virtual CMTS associated with the 5G NR Core (5GC) 365. The vCMTS interfaces with the RCDN content switch 362 to support DOCSIS delivery out to the edge portions 382 of the network for delivery of multisource content. The edge switch 378 interfaces with the RCDN switch 362 for, inter alia, integration of edge-sourced content (e.g., user uploaded or streamed content, local programming, etc. via the 5GC user-plane function 365).

In one embodiment, both IP data content and IP-packetized audio/video content is delivered to various user CPE 316 and client devices 318, and gateway device(s) 360 as applicable, via the interposed network infrastructure including downstream MSO-based DOCSIS delivery 385. According to this embodiment, all of the content is delivered on DOCSIS channels, which are received by a premises CPE or gateway and distributed to one or more respective client devices/UEs 318 in communication therewith, such as via WLAN or Ethernet connectivity.

In the illustrated variant, the edge node (or "cloud" of nodes) includes a Multi-access Edge Computing (MEC) edge platform 313 capable of performing a variety of functions including edge computing and control of content delivery to the CPE 316. In one implementation, a Multi-access Edge Computing (MEC) standard architecture created by the European Telecommunications Standards Institute's (ETSI's) MEC group is utilized. Exemplary MEC implementations are described in multiple versions from ETSI GR MEC-IEG 005 V1.1.1 (2015 August) through ETSI GS MEC 029 V2.1.1 (2019 July), each of which is incorporated by reference herein in its entirety. It will be appreciated, however that the MEC implementation described above is merely exemplary, and other configurations may be used consistent with the present invention.

As shown in FIG. 3B, the edge cloud platform 313 includes the aforementioned ML/AI engine 320 and control function 321, as described in greater detail below. Via the MEC gateway to the various access networks (i.e., 5G NR gNB 366 and infrastructure, and/or CBRS CBSD 364 and infrastructure), the edge platform 313 is able to perform a number of functions with ultra-low latency, including receipt and processing of CPE-originated control data (see discussion of FIG. 4 below) and inclusion of local or user-originated content (if any) within the "fused" or aggregated data stream generated for delivery to the user's CPE 316.

The user or subscriber devices such as CPE 316, 5G-capable media capture device 319 (e.g., a smartphone, tablet, or the like in one embodiment), and 3GPP-compliant UE 318 (e.g., smartphones or other mobile devices, which may be integrated with the capture device 319) may be in direct communication the NG Core 365 via the interposed 5G or CBRS network infrastructure. User control data and content for instance may be uploaded from any client device via an IP session established over a 5G NR connection to the NG Core 365.

The controller process 321 of the exemplary configuration of the edge platform 313 is configured to cause aggregation of (i) network content (e.g., VOD, broadcast, live, etc.) from the CDN 383, and (ii) user content (e.g., user-generated video, local data, etc.) from subscriber and/or non-subscriber devices 318 (e.g., a PC or smartphone-originated user made video which is uploaded, such as to an Internet 311 or MSO-operated social media portal 386, utilizing 5G NR), based on the user-generated control data received via the low-latency link(s) to create a composite content stream including both the user content/data uploaded from the client device and the network-sourced content received from the CDN 383. For instance, a user gesture (described below) may equate to a command to remove one content stream from delivery, and include another content stream in its place. Once this gesture is "recognized" by the edge platform 313, a command is generated for transmission to the content encoding process 322 (which may be disposed locally at the edge node 382 as in a DAA or distributed architecture) to effect the desired change to the user's fused or single media stream.

As previously described, multi-stream aggregation/fusion is performed in one configuration at either at micro/macro edge compute platform 313 (including e.g., Nvidia-based DGX/HGX or similar platforms for heavy processing overhead compute tasks in support of gesture and other control functions including machine-learning or training), which may be located in close proximity to the MEC GW 367 (and hence access to the MSO and 5G core functions).

Local gesture detection is in the illustrated embodiment performed using premises CPE, supported by the edge cloud computing platforms (e.g., for training and ML functions) locally powered by the local-edge GPU processing), In one variant, the user defined (e.g. custom) gesture templates are stored in the user's profile within the cloud data base for use in updating the local device (CPE) and maintains a secure repository of user-specific control/commands for a number of different users within the same premises (e.g., family members), and for different premises/subscriber accounts.

As shown in FIG. 3B, the recognized/detected commands from the premises are backhauled to the local-edge for processing (e.g., via 5G NR/NR-U or other low-latency "side" channel, and then utilized in effecting control of the aggregated multi-stream content via the micro/macro edge compute platforms. The interacted-with/newly configured/re-encoded aggregated content stream is then delivered back to the client at the premises (e.g., via DOCSIS downstream or DL QAM or other mechanism) from the micro/macro-edge compute repository.

It will be appreciated that while 5G NR/NR-U is shown as a basis for the low-latency side channel, it is also contemplated that as technology evolves, alternative or after-developed low latency mechanisms may be used to provide this channel, including those implemented within extant MSO infrastructure (such as e.g., DOCSIS 4.0, which ostensibly provides 10× uplink speed as compared to extant DOCSIS, and which supports 10G low-latency). In this fashion, DL and UL channels used in support of the gesture control and content aggregation functionality described herein may be used for enhanced efficiency and MSO integration (including obviating having to maintain via the user a separate wireless connection/service).

ACS Encoding and Distribution Architecture—

Figure 4:
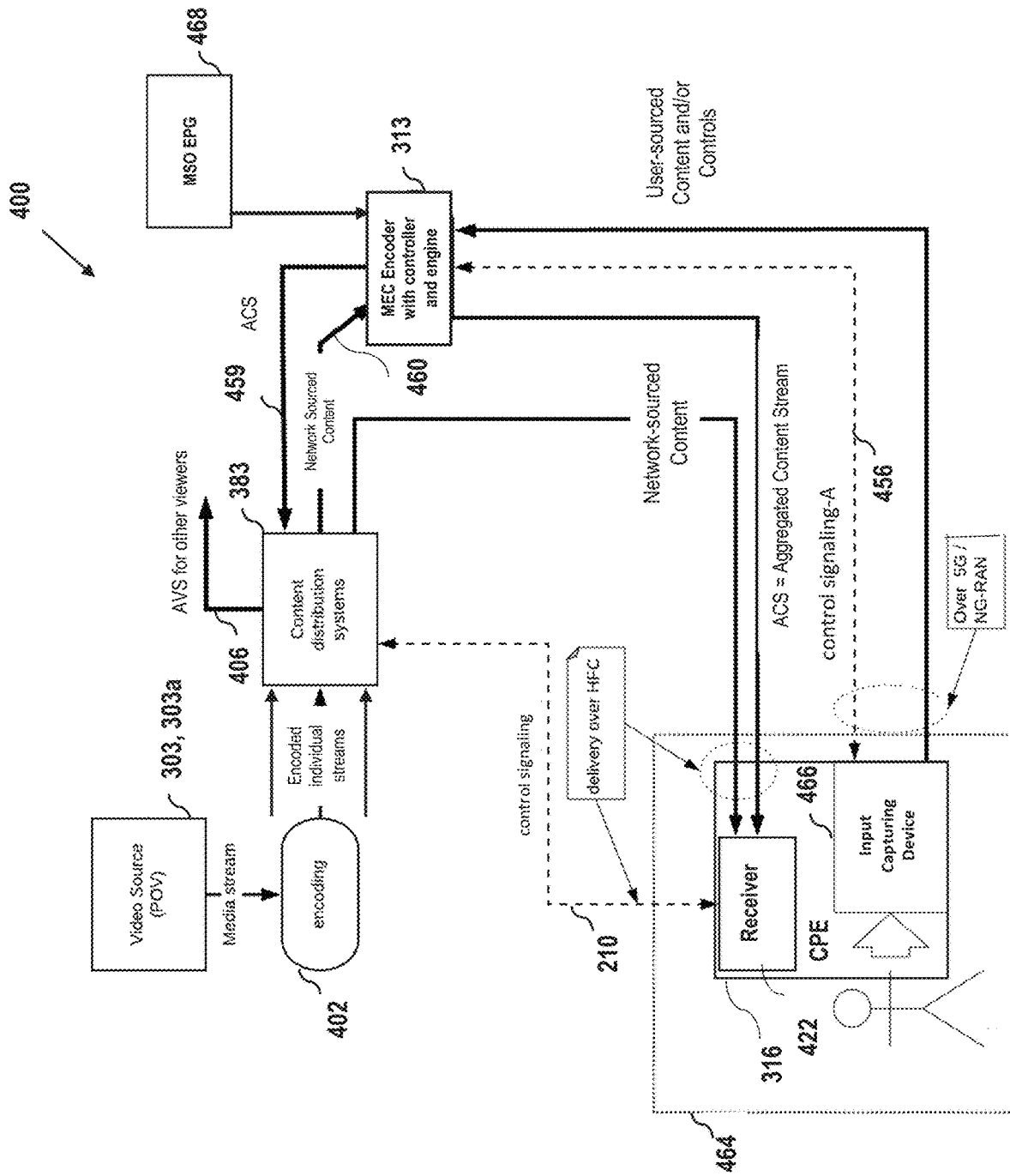
FIG. 4 is a functional block diagram of an exemplary embodiment of an aggregated content stream control and distribution architecture, according to the present disclosure.

Referring now to FIG. 4, an exemplary embodiment of a content distribution architecture 400 adapted for content aggregating and control according to the present disclosure is described in detail.

It is noted that the apparatus, systems and methods described below are useful in providing access to a variety of content types from a variety of different sources, including for instance user-initiated content (e.g., user-generated and uploaded content), local content (e.g., that generated at the edge of the distribution network such as for public access or other similar channels, security monitoring feeds, etc.) as well as MSO-ingested content.

The architecture 400 of FIG. 4 includes content distribution systems or CDN 383, and one or more encoding processes 402 fed from a variety of content source(s) 303, 303a. Additionally, the architecture 400 includes the aforementioned edge platform (e.g., MEC) 313 which receives a plurality of network- and other-sourced content (and optionally user-generated content as shown) as well as user-initiated control data 456 captured by the input/capturing device 466 (e.g., integrated with the CPE 316 as shown, or in stand-alone or even mobile device form), and carried by the low-latency (e.g., 5G NR) bearer(s) to effect control of the stream aggregation functions performed by the multi-stream encoder 322 of the edge platform 313.

As a brief aside, in contrast to the comparatively high degree of latency and instability which may be encountered on certain extant uplink technologies such as DOCSIS 3.0 (discussed above), 5G NR technology has both ultra-low latency requirements (i.e., 1 ms or less round-trip between endpoint nodes) on UL and DL, and much greater inherent stability. It is noted that with respect to the specific context of overlaying or synchronizing networking programming or live events with user control or content uploaded using 5G, infrastructure-induced latency associated with the networking programming or live event being combined with the user upload should be accounted for. Accordingly, the methods and apparatus of the present disclosure advantageously enable synchronization of two or more different media streams—e.g., (i) network programming received over traditional coaxial infrastructure (e.g., "in band" and DOCSIS (and OOB) transport), and (ii) personal content (e.g., user-generated content) received over an IP connection using 5G NR—such that the different content is synchronized or overlaid in the correct time relationship, and/or command data is evaluated and effected such that the user does not perceive any "jerkiness" or significant lag between an issued gesture or voice command and implementation of the desired function. As previously noted, this capability stems largely from the predictability of the downstream delivery channels (i.e., MSO in-band or DOCSIS QAMs with high levels of QoS), and the predictable low latency of the upstream (e.g., 5G NR) link(s). Specifically, the use of the 5G NR bearer for delivery of content to the encoding server (e.g., edge platform 313) enables a degree of certainty at least with regard to delivery of the user-sourced, user input, or other enhancement content/data in that the extremely low maximum latency "guarantee" associated with the 5G NR bearer effectively sets a tight window for purposes of total delay estimation (and synchronization if required). Specifically, by knowing that the maximum bearer-induced temporal latency is on the order of 1.0 ms, that "leg" of the process will in effect always be within 1 ms, whether the actual latency experienced in any given scenario is near zero, or at 1.0 ms. Stated differently, the most that this leg of the delivery process can be off by (plus or minus) is 1.0 ms, which is insignificant from a user perception and temporal synchronization perspective, thereby advantageously avoiding prior art "jerkiness" or delay, and lack of temporal synchronization.

The foregoing aspects, coupled with the disposition of the edge platform 313 proximate the served premises within the network topology, afford and effectively seamless and highly responsive control and feedback loop for each user, while also minimizing consumption of downstream bandwidth by virtue of aggregation or consolidation of multiple streams into one encoded stream. This approach also provides the flexibility to include local or user-sourced content (originating at the very edge of the topology) seamlessly, since it does not have to be backhauled to the MSO core or other centralized network location.

Referring again to FIG. 4, in one exemplary embodiment of the improved architecture 400, the content received from the various network source(s) 303, 303a may be processed via one or more encoding processes 402 before it arrives at a content distribution network (CDN) 383. For example, the content may arrive at the CDN 383 in a digitally encoded format, such as MPEG-4 or HEVC. The MPEG-4 and HEVC standards are ubiquitous and specify, inter alia, methodologies for video and audio data compression and encoding, and is able to compress video much more efficiently than earlier video coding standards, including MPEG-2. HEVC affords very high quality "lossy" compression with comparatively low bandwidth consumption, making it particularly advantageous for use in both the ingestion encoder 402 (if used) and the MEC edge platform 313 for encoding the composite or aggregated stream.

As a brief aside, digital encoding utilizes one or more forms of video compression in order to economize on storage space and transmission bandwidth. Without such video compression, digital video content can require extremely large amounts of data storage capacity, making it difficult or even impossible for the digital video content to be efficiently stored, transmitted, or viewed. Consequently, video coding standards have been developed to standardize the various video coding methods so that the compressed digital video content is rendered in formats that a majority of video decoders can recognize. For example, the Motion Picture Experts Group (MPEG) and International Telecommunication Union (ITU-T) have developed video coding standards that are in wide use. Examples of these standards include the MPEG-1, MPEG-2, MPEG-4, ITU-T H.261, and ITU-T H.263 standards. The MPEG-4 Advanced Video Coding (AVC) standard (also known as MPEG-4, Part 10) is a standard jointly developed by the International Organization for Standardization (ISO) and ITU-T. The MPEG-4 AVC standard is published as ITU-T H.264 and ISO/IEC 14496-10, and the more recent H.265/HEVC.

As noted above, content often arrives from content sources at a content distribution network (CDN) such as the CDN 383 of FIG. 4 in a digitally encoded format, such as MPEG-2. The MPEG-2 standard is ubiquitous and specifies, inter alia, methodologies for video and audio data compression and encoding. Specifically, in accordance with the MPEG-2 standard, video data is compressed based on a sequence of GOPs, made up of three types of picture frames: coded picture frames ("I-frames"), forward predictive frames ("P-frames") and bilinear frames ("B-frames"). Each GOP may, for example, begin with an I-frame which is obtained by spatially compressing a complete picture using discrete cosine transform (DCT). As a result, if an error or a channel switch occurs, it is possible to resume correct decoding at the next I-frame. The GOP may represent additional frames by providing a much smaller block of digital data that indicates how small portions of the I-frame, referred to as macroblocks, move over time.

Encoders such as MPEG-2 achieve compression by assuming that only small portions of an image change over time, making the representation of these additional frames compact. Although GOPs have no relationship between themselves, the frames within a GOP have a specific relationship which builds off the initial I-frame.

In a traditional content delivery scheme (e.g., for a cable network), the compressed video and audio data are carried by continuous elementary streams, respectively, which are broken into access units or packets, resulting in packetized elementary streams (PESs). These packets are identified by headers that contain time stamps for synchronizing, and are used to form MPEG-2 transport streams, which utilize MPEG-2 encoded video content as their payload.

However, despite its ubiquity, MPEG-2 has salient limitations, especially relating to transmission bandwidth and storage. The more recently developed H.264 and H.265 video coding standards are able to compress video much more efficiently than earlier video coding standards, including MPEG-2.

Digital encoding also advantageously lends itself to transcoding of content. As used herein, the term "transcoding" refers generally to the process of changing content from one encoding to another. This may be accomplished for example by decoding the encoded content, and then re-encoding this into the target format. Transcoding can also accomplish the encoding of content to a lower bitrate without changing video formats, a process that is known as transrating.

Transcoding is used in many areas of content adaptation; however, it is commonly employed in the area of mobile devices such as smartphones, tablets, and the like. In such mobile applications, transcoding is essential due to the diversity of mobile devices. This diversity effectively requires an intermediate state of content adaptation, so as to ensure that the source content will adequately present or "render" on the target mobile device.

Delivery of encoded content may also utilize a technology known as "adaptive bitrate streaming." Adaptive bitrate (ABR) streaming is a technique to distribute program content over a large distributed network in an efficient manner based on, inter alia, available streaming capacity. In one implementation, multiple bitrates of a particular piece of content are available to stream to a viewer, and the selection of the bitrate is based on current network conditions. This means that when there is greater bandwidth availability, a larger bitrate version of the content may be selected. If available bandwidth narrows, a lower bitrate (i.e., smaller) version of the content may be selected to provide a seamless user experience. Typical ABR streaming solutions include e.g., DASH (dynamic adaptive streaming over HTTP), Microsoft Smooth Streaming, and Adobe HTTP Dynamic Streaming, which are further particularly adapted for HTTP-based environments such as Internet delivery. ABR streaming protocols are typically codec-agnostic (e.g., may use content encoded in e.g., H.264, H.265, MPEG-2, or others), and are notably distinguishable from such underlying encoding.

Hence, the present disclosure contemplates that the encoding process performed by the "aggregation" encoder 322 (which may for example be located in the edge platform 313, or elsewhere) may utilize (i) any number of different or heterogeneous codecs in encoding the fused or single media streams (e.g., one stream may be H.264, another H.265, etc.), and/or (ii) any number of different bitrates, including ABR-based approaches. In one implementation, an FFmpeg-based approach is utilized by the aggregation encoder. As a brief aside, FFmpeg is an open-source project consisting of a suite of libraries and programs for processing multimedia files and streams. FFmpeg is designed for command-line-based processing of video and audio files, and is useful for various processes such as transcoding, trimming and concatenation, scaling, post-production, and standards compliance (e.g., SMPTE, ITU). It also includes libavcodec, an audio/video codec library, libavformat (Lavf), an audio/video container mux and demux library, and the core ffmpeg command line program for transcoding multimedia files. It will be appreciated by those of ordinary skill given the present disclosure, however, that other approaches to aggregate stream encoding may be used consistent with the present disclosure, such as e.g., ZoneMinder or Motion.

Notably, in contrast to the previously described individual encoding of different content streams (and the resultant processing overhead and bandwidth consumed thereby in delivery), exemplary embodiments of the present disclosure use a composite encoding process; i.e., where the plurality of constituent streams are encoded collectively, with each frame of encoded video data comprising in effect a frame of the constituent data streams.

Returning again to FIG. 4, the present disclosure contemplates a served premises (e.g., household, enterprise, venue, or person(s)) 464 having access to two or more independent communications paths (e.g., see the architectures of FIGS. 3 and 3A discussed above). As but one example, in the exemplary configuration of the architecture 400 of FIG. 4, a user may have access to a CPE 316 (e.g., a DSTB, home gateway devices and/or media client devices, such as Smart TV or the like), which may have wired or wireless connection (e.g., connected to a HFC/DOCSIS cable modem via a wireless communications network such as a wireless LAN (e.g., Wi-Fi)). Additionally, a user may have access to a client device 318, which in various embodiments, includes a 5G-capable media capture device 466 (e.g., a smartphone, tablet, or the like) which interfaces with a 5G service provider network (such as architecture of FIGS. 3 and 3A). The image capture device may also be fully integrated with the CPE 316 (or gateway 360) host device, and the host device may include an indigenous WAN or MAN modem (see FIG. 3) capable of communication with the access node 314. In another variant, the served premises includes a 3GPP (e.g., NR-U) small cell or CBRS FWA. Yet other approaches for providing user connectivity to the low-latency services will be appreciated by those of ordinary skill given the present disclosure.

In operation, the MEC edge platform 313 is configured to receive (i) network content (e.g., VOD, broadcast, live, etc.) 460 from the CDN 3383, (ii) third party sourced data (if not originated from the MSO network CDN) such as Internet media or OTT streams, and (iii) user-generated video and gesture control data from the subscriber and/or non-subscriber devices (e.g., a PC or smartphone-originated user made video which is uploaded, such as to an Internet 311 or MSO-operated social media portal 386 (see FIG. 3B), utilizing 5G NR). The edge platform 313 is further configured to create a composite content stream including various combinations of the foregoing as desired by the user; i.e., an "aggregated content stream" (ACS). It will be appreciated that while a two- or three-element ACS is described in the various exemplary embodiments (for sake of simplicity), the present disclosure contemplates ACS comprising four or more discrete or separately sourced content elements (e.g., Network Content+User 1 upload content . . . +User n upload content, or Network Content 1+Network Content 2+User upload content 1, or Network Content 1+User n upload content).

It will also be appreciated that the various constituent components of the ACS may be temporally intermixed, such as where during a first period, the constituent components include a different "mix" than during a second period, and so forth. For example, it may be germane to have User 1's uploaded content combined with the network sourced content during a first portion or logical segment thereof (e.g., an act, scene, event, etc.), while that of User 2 is more relevant to another portion.

As the various content is to be combined with other programming (e.g., one or more other channels), in some embodiments, routing information may be provided to the edge platform 313. The routing information may specify the source of the programming content to be combined. In some variants, the routing information may be an IP address of the HFC network entity (e.g., a content or CDN server), however it is further appreciated that routing information may require significant amounts of network address translation (for e.g., security reasons, the CPE generally would not have access to the address of a CDN or origin server, etc.).

Additionally, the edge platform 313 may utilize control signaling to synchronize the fused or single media stream. For example, in various embodiments, the edge platform can create an unsynchronized fused single media content stream (e.g., over IP)—i.e., the time reference between the network sourced content, the OTT content, and the user content is not synchronized—and transmit the unsynchronized composite content stream components to the rendering device e.g., CPE 316 with receiver 422. While the extant MSO infrastructure control signaling channel 210 is shown in FIG. 4 (e.g., communication back up through the DOCSIS backhaul of the HFC network) may be used for certain control functions if desired (e.g., the user's VOD, StartOver, or other stream control commands; e.g., LSCP or similar used to control the delivery to the CDN 383 of a selected VOD stream that the user desires to be included in their ACS), although control of such stream may also be subsumed within the control signaling 456 transmitted to the edge platform 313. For example, a user-defined "skill" for VOD pause may be known to the edge platform 313, which, when the appropriate gesture or voice data is received, causes issuance of an LSCP or similar command to the applicable VOD server to pause the stream. As such, the user would see, in the delivered ACS, a plurality of active windows for other content, with the VOD stream window frozen or paused.

Where temporal synchronization is required, the present disclosure contemplates user-controlled synchronization or time-shifting inputs via the control channel 456 (e.g., via a prescribed gesture "skill" as described below which temporally adjusts on content stream relative to another, such as a 2-second advance or retard of the timing such that e.g., a local user's commentary is appropriately synched with the primary content stream that is the target of the commentary For instance, in various embodiments, the synchronization may employ any of the apparatus and processes discussed in co-owned, co-pending U.S. patent application Ser. No. 16/393,745 filed on Apr. 24, 2019 entitled "Apparatus and Methods for Personalized Content Synchronization and Delivery in a Content Distribution Network," and issued as U.S. Pat. No. 10,887,647 on Jan. 5, 2021, which is incorporated herein by reference in its entirety. As consistent therewith, utilizing the signaling information, the edge platform 313 herein can adjust the timing discrepancy between the respective frames of the network-sourced content and the user content (either by temporally advancing or delaying respective frames) to synchronize the frames and create the ACS. Moreover, in various implementations, the edge platform 313 can transmit the ACS to the content distribution system 383 (e.g., via a transport or medium 459, which may include for instance a PCIe, 10 GbE, millimeter wave, 5G NR, or other interface between the systems, depending on configuration and location of each) for other viewers to consume (e.g., via social media such as YouTube, Twitch, etc.), or to the requesting user (via any one of client devices 316, 318) for reviewing the ACS.

In some variants, the receiving CPE 316 or associated client 318 is touch-enabled (e.g., via a capacitive touch pad or screen or the like), and also utilizes a gesture recognition/feedback process. The remote (networked/cloud) edge platform 313 receives touch and gesture data generated by the client(s) and utilizes it for e.g., correlation to products, services, or content displayed or advertised to the users at the premises 464 (i.e., how a given user responds in terms of actions, gestures, etc. when shown a product in an advertisement, or a promotion for a given content element (e.g., movie or series episode), as well as control of user/premises activities (e.g., gesture control data, channel changes, programming selections, behavior during advertisements, purchase made by the user, etc.). This aspect provides an additional layer of integration and capability to the system; i.e., not only are the skill-based commands input by the user, but they are also analyzed by e.g., the edge platform (analytics engine 320) or its proxy to glean useful data for the MSO or other content provider as to user behavior relative to the content. For instance, the edge platform can correlate user inputs or events (channel change or stream substitution) to other events (e.g., an advertisement running in the replaced stream), and/or user client device 318 inputs via the touch screen or voice commend input of the client device 318 (e.g., Internet search, app selection, etc.) to better model user behavior, desires, psychographics, etc.

It will be appreciated that aggregation of data/content may be accomplished by the edge platform 313 at one or more network "edge" nodes with respect to multiple premises (only one shown in FIG. 4).

It will also be appreciated that the edge platform 313 and its functionality may be integrated or communicative with EPG (electronic program guide) or other such extant functions 468 of the MSO network. As a brief aside, in order to support the foregoing operational flexibility (and to gain operational and economic efficiencies), technology stacks have over time generally migrated towards the "cloud" or network side of the foregoing managed service provider networks (e.g., into the RNDCs 381 of FIG. 3B), and away from the end user (client) consuming devices; e.g., at the served premises 464. Hence, the CPE or client device's or user's content selection, description and presentation capabilities are dictated increasingly by these cloud-based functions (including network-side guide data generation architectures), along with the on-board storage and processing power of the CPE/client device and its associated software stack. This "cloud control" provides the network operators (and third parties such as advertisers) significant opportunities (including those previously described with respect to new skills development, including combination of new gesture control-based skills with one or more of audible/speech and tactile or manual control inputs) in terms of user/premises customization and personalization, whether relating to content delivery and control, advertising, or yet other functions. Data regarding user/premises activities (e.g., gesture control data, channel changes, programming selections, behavior during advertisements, purchase made by the user, etc.) can be sent up to the cloud for analysis/processing and storage (such as by the edge platform 313), including generation of user-specific, premises-specific, and/or device-specific profiles that can be used for later configuring services provided to that particular user/premises/device. As discussed elsewhere herein, such profiles can also include user-specific skills profiles or functions.

As one example, cloud-based EPGs (electronic program guides) are increasingly configured to provide a customizable and user-specific experience (e.g., populating the guide with content targeted for the user/premises, and ancillary information such as data from third parties), as well as the additional aspects of reduced device processing and storage footprint, and a consistent and simple mechanism for software upgrades across multiple different types of HW/SW platforms (e.g., different OEM devices). For instance, HTML 5-based cloud apps are increasingly replacing native apps (i.e., those incorporated into the design of the device at time of manufacture) for implementing such functions. Exemplary implementations such as the cloud-based Spectrum Guide offered by the Assignee hereof integrate data from multiple sources in forming an "aggregated" user interface with which the user interacts via their premises client device (e.g., Smart TV, DSTB, or mobile device). Such aggregation is merely at the UI level, however; i.e., it merely shows what sources or content elements a user has at their disposal within a common UI framework.

Specifically, in the foregoing example of the Spectrum Guide cloud-delivered EPG, all EPG objects (from content poster art to the elements of the day/time grid, and most visual video content) is stitched and delivered as a single stream to the client device, as opposed to being indigenously generated by the client. The program guide elements (e.g., graphics) are stitched together as a video transport stream, while video content that is utilized within a window or other display element of this program guide on the user device comes from a different source, and any advertisements come from yet a third location, akin to the operation of a web browser.

Such cloud-based functionality also provides enhanced opportunity for data "fusion" for the user. As previously noted, data from various heterogeneous sources can be accessed via the cloud architecture, and transmitted to the user's client device via e.g., the aforementioned aggregated content stream. For example, data associated with tailored or personalized news feeds, user-specific email or text message alerts, VoIP call status, etc. can be obtained and provided to the user via the cloud-based UI (e.g., EPG). For example, the present disclosure provides, in one embodiment, that one of the sources (besides typical network programming sources, local sources, or user-generated content sources) is cloud EPG guide data received from a cloud EPG server 468 or other process, which is processed by the edge platform 313 to form an aggregated user interface (UI) which includes EPG content. In one such variant, the EPG data "stream" is itself a constituent of the aggregated or fused or single media stream formed by the edge platform encoder (i.e., an aggregate stream within an aggregate stream). In another variant, the EPG UI objects each comprise a separate input to the aggregation encoder 322.

Moreover, user interface with the "embedded" EPG data can be effected via the previously described gesture and/or voice control mechanisms. For instance, in one variant, one skill implemented by the user and edge platform controller 321 may include EPG interactivity, such as where a user invokes the EPG function by a prescribed gesture. This command causes the embedded EPG stream to change context (e.g., become the active context), and also enable a "sub-menu" of gesture and/or voice skills applicable to EPG navigation (e.g., preview functions, title/keyword, or contextually-based searches, etc.). Such EPG sub-menu may also call for aggregation of one or more virtual channels or streams by the edge encoder; i.e., the EPG itself may comprise composite display formatting (e.g., a plurality of windows each representative of content associated with a respective channel or source) which has been aggregated by the encoder 322.

Also useful to the user is data relating to the user's premises equipment and configuration. For example, computerized devices within the user's premises (other than those provided by, or associated with the services of the MSO or service provider) may exist, including for instance personal electronics, appliances, security systems, and home automation systems. One emerging class of such non-service provider devices are so called "IoT" or "Internet of Things" devices, aimed at providing enhanced data communication functionality between the IoT devices and third parties (e.g., a service provider), and between the IoT devices themselves. Such devices may be integrated into the content aggregation, control and delivery schemes described herein, further enhancing fusion of data/information useful to the user in a single interface. For example, in one such variant, the user's IoT-enabled device (e.g., HVAC or security system) is wirelessly coupled (via e.g., BLE or IEEE Std. 802.15.4 PAN or other) to the CPE 316 or other device, and the latter can pass the IoT data (e.g., a security feed from the user's front door, or a graphic of temperatures and HVAC equipment status) from the user's premises to the MEC edge platform 313 for inclusion within the ACS delivered back to the user's CPE. Hence, the user can advantageously combine e.g., (i) network-sourced content, (ii) OTT stream data, and (iii) local IoT sourced data, into a common UI. As with the other content sources above, one or more skills may also be implemented for these IoT devices, such as a gesture command to turn off the air conditioner, or switch security camera feeds. In one such variant, the command interpreted by the edge platform 313 is transmitted back to an app or other process operative on the CPE 316 or a client device 318 via a downstream channel of the 5 g NR or other low latency link, for distribution to the controlled IoT device within the premises. Alternatively, the IoT device may be "networked" (e.g., have an IP or other network address) that is directly accessible by the edge platform or a proxy thereof (e.g., an MSO "IoT" server for users/subscribers).

In some embodiments, the edge platform 313 is configured to utilize artificial intelligence and machine learning algorithms operative within the engine 320 to, e.g., automatically suggest actions to the user or change settings based on user-provided control or other data, as well as identifying commonalities across multiple different customers or sites served by the network operator or service provider.

Additionally, various feedback mechanisms may also be utilized to enable the edge platform 313 to "learn" from the user's activities in order to update the user profile and generate more finely-tuned and cogent recommendations.

For instance, in some embodiments, the edge platform is configured to use M2M learning or other logic to identify and learn patterns for adapting products and/or services to particular user traits or habits; for instance, targeted service or advertising provision can be effectively based on user-specific habits or traits (e.g., a person who frequently uses their IoT-connected microwave oven may lean toward microwave-able food items, and may benefit from advertising relating thereto). The edge platform may both identify patterns or specific attributes behaviors on a per-customer basis, as well as across multiple different customers. In one such aspect, the edge platform 313 of a network operator is placed in communication with a given customer site after installation of an IoT-enabled CPE 316, hub or gateway(s) 360, etc. at the site, and in effect "learns" the patterns, data types, issues, etc. associated with that particular site (and that particular type or class of site; e.g., farm, university, enterprise, etc.) through machine learning (ML) and AI algorithms resident on the engine 320. As such, this learned behavior can also be applied to both subsequent operations of the same site, and other similarly situated sites. In one variant, the analytics engine 320 is configured to build site "templates" which contain rules and relevant data for various types of commands, gestures, selections, etc., in addition to per-user templates or profiles for specific persons within a given premises.

Methods—

Figure 5:
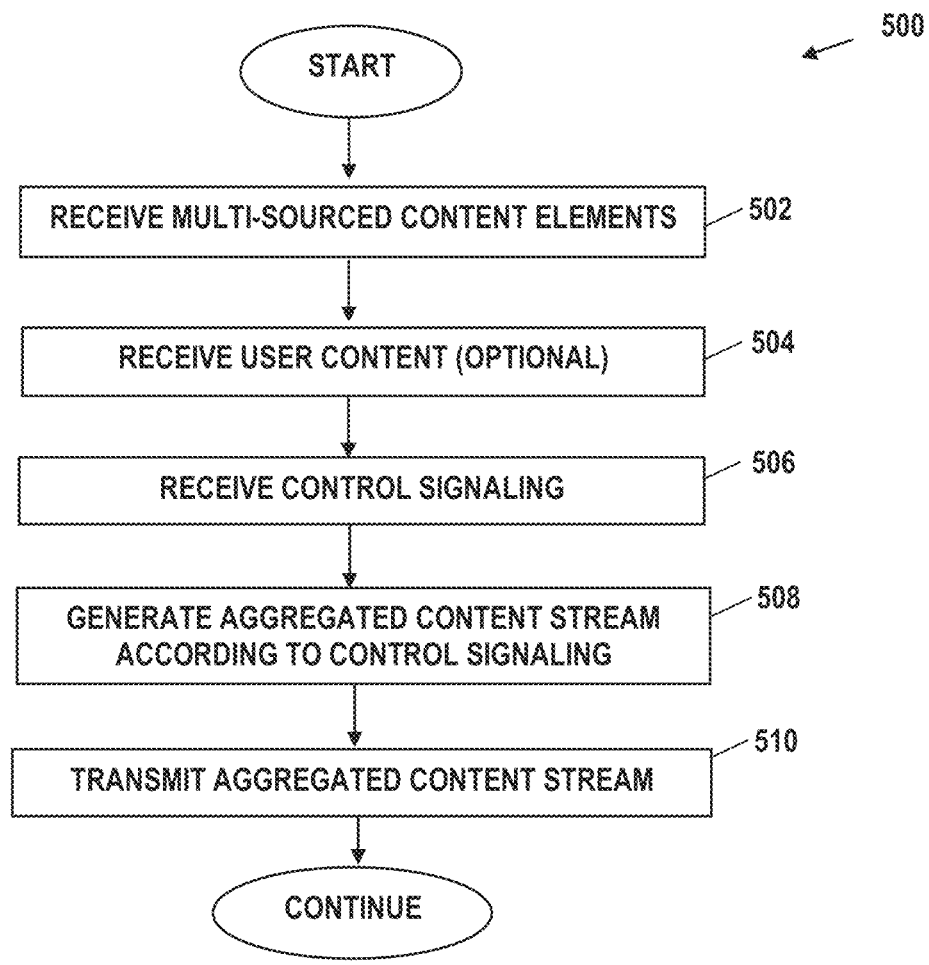
FIG. 5 is a logical flow diagram illustrating one exemplary embodiment of a generalized method for aggregating at least two different content streams via a manual adjustment process, according to the present disclosure.

Referring now to FIG. 5, one exemplary embodiment of a generalized method 500 for aggregating two or more different content streams as well as integrating user controls in accordance with the present disclosure is provided. Although the steps of method 500 are at least substantially performed by the aggregating processor entity (corresponding to the previously described edge platform 313 in some embodiments), in practical embodiments, some of these steps (or sub-steps within each step) may be implemented in parallel, on different hardware platforms or software environments, performed iteratively, deleted, and so forth.

In the first step 502 of the method 500, multi-source (network-sourced) content is received. In one embodiment, multiple different streams, each carrying different network programming, are received. In some embodiments, the network content is received at the edge platform 313 and/or gateway 367 from the CDN 383.

In various embodiments, the network programming can include broadcast video and audio programming, a live program delivered by the broadcast television network, Video on Demand (VOD) content, DVR, linear broadcasts, start-over content, IPTV content, third party customized background scenes, gaming content, EPG data, etc.

At step 504, user-initiated or -designated content may optionally be received. In one exemplary embodiment, the user content is uploaded to the edge platform from the client device (e.g., CPE 316 or client 318). In various implementations, the user content may be received from subscriber and/or non-subscriber devices. In some embodiments, the CPE/client device may be a video capture device (e.g., a smartphone with a camera), such that the user records content thereby. For example, a PC or smartphone-originated user made video may be uploaded to the edge platform 313, in some variants, via an Internet or MSO-operated social media portal 386 (see FIG. 3B).

As previously described, the present disclosure in one embodiment leverages 5G NR for uploading the user content in order to provide a stable bit pipe with expected (predictable) available bandwidth and latency. Accordingly, the client device may be a 5G-enabled client device that establishes a wireless Internet-Protocol (IP) connection to the edge platform 313 using a 3GPP 5G NR backhaul. However, other protocols and transport mechanisms with suitable performance (e.g., low/predictable latency and bandwidth availability) may be substituted.

At step 506, control signals are received. In one embodiment, the user can watch the composite video stream on the CPE 316, and use the control signaling-A (see FIG. 4) on the video capturing device 466 to indicate various actions. As discussed in further detail in FIG. 7, in one implementation, a gesture recognition/feedback process is utilized. The edge platform 313 receives the gesture data generated by the clients and utilizes it for e.g., user/premises activities (e.g., channel changes, composite element/programming selections, EPG functions, determining behavior during advertisements, purchases made by the user, etc.), and/or correlation to products, services, or content displayed or advertised to the users at the premises (i.e., how a given user responds in terms of actions, gestures, etc. when shown a product in an advertisement, or a promotion for a given content element (e.g., movie or series episode).

Figure 6:
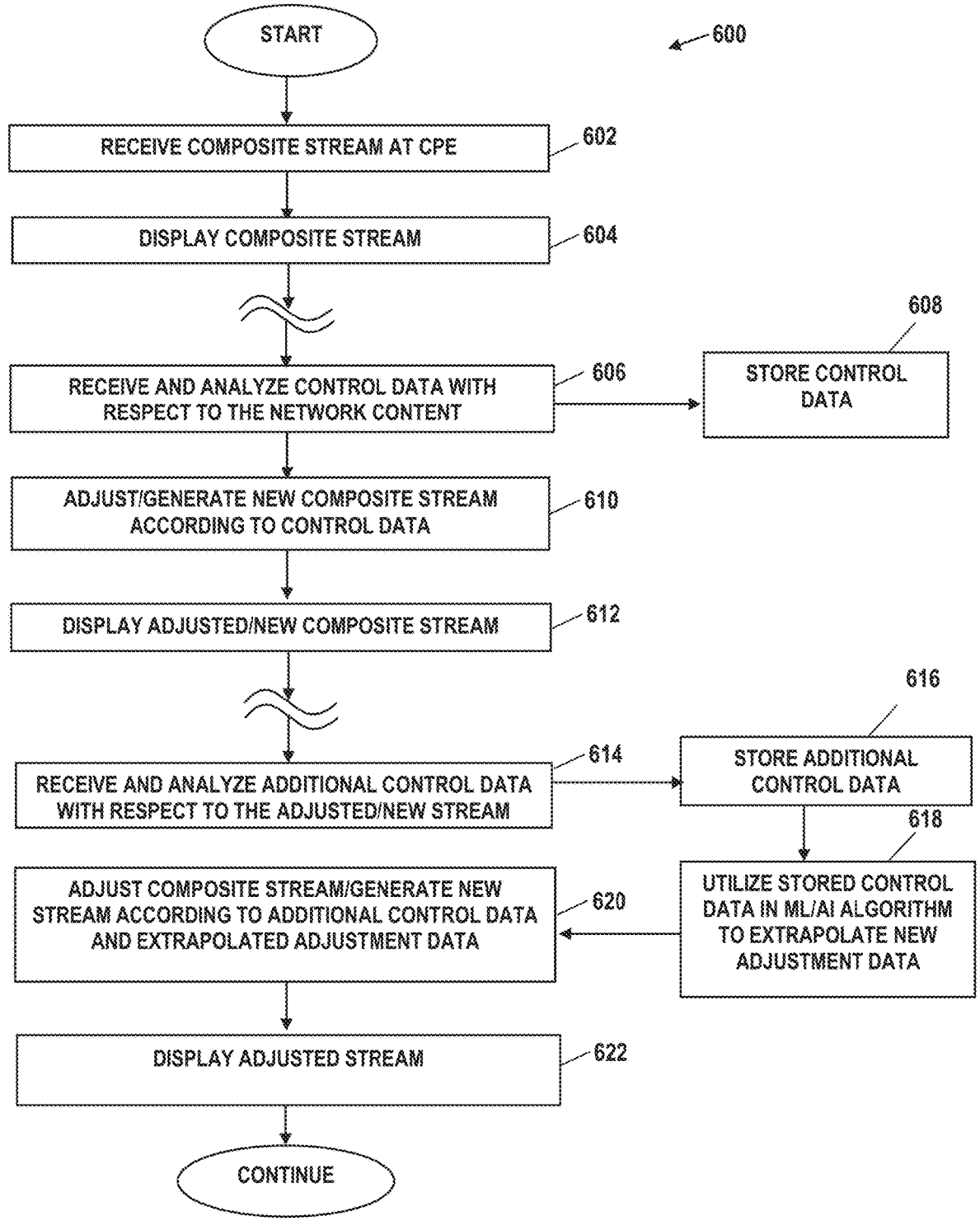
FIG. 6 is a logical flow diagram illustrating one exemplary embodiment of the method of FIG. 5, wherein multiple control inputs are received and used for extrapolation of subsequent adjustment data.

Additionally, as discussed in further detail in FIG. 6, artificial intelligence and machine learning (e.g., operative within the "edge" or "cloud" 386) may utilize the user input to automatically suggest actions to the user or change settings, as well as identifying commonalities across multiple different customers or sites served by the network operator or service provider. In one such aspect, the edge platform 313 through machine learning (ML) and AI algorithms in effect "learns" the patterns, preferences, etc. associated with a particular user and/or premises. As such, this learned behavior can also be applied to various operations/rules.

At step 508, a composite content stream is generated based on the user's control input of step 506. In one embodiment, the fused or single media stream may include both the user content (if uploaded) and the network content (e.g., Network Content+User 1 upload content, or Network Content+User 1 upload content . . . +User n upload content, or Network Content 1+Network Content 2+User upload content 1). In other embodiments, the fused or single media stream may include just network programming (e.g., Network Content 1+Network Content n). In yet other embodiments, OTT and Internet sourced content are included in the fused or single media stream.

Figure 10:
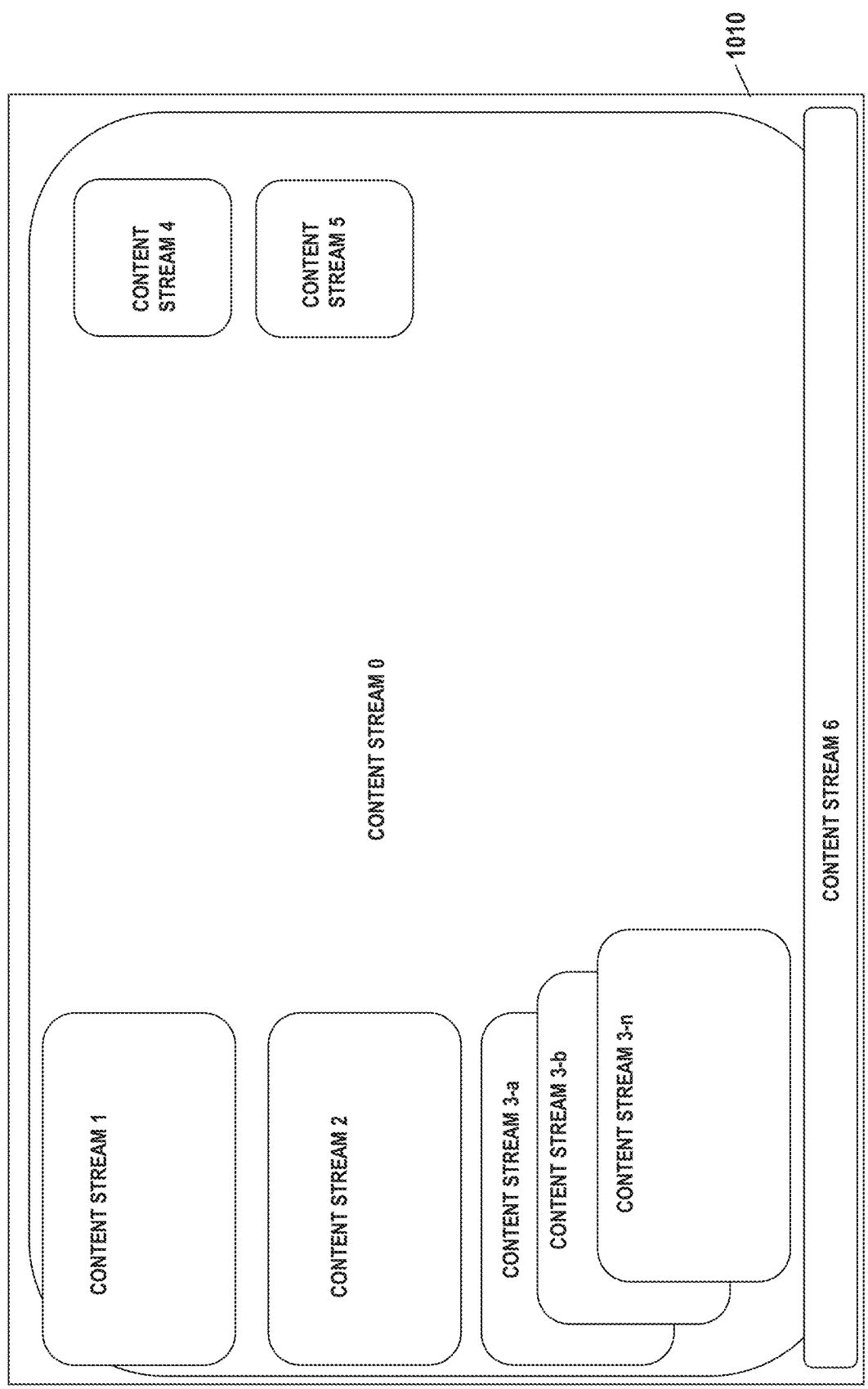
FIG. 10 is a graphical representation illustrating an exemplary embodiment of an aggregated display according to the present disclosure.
Figure 10A:
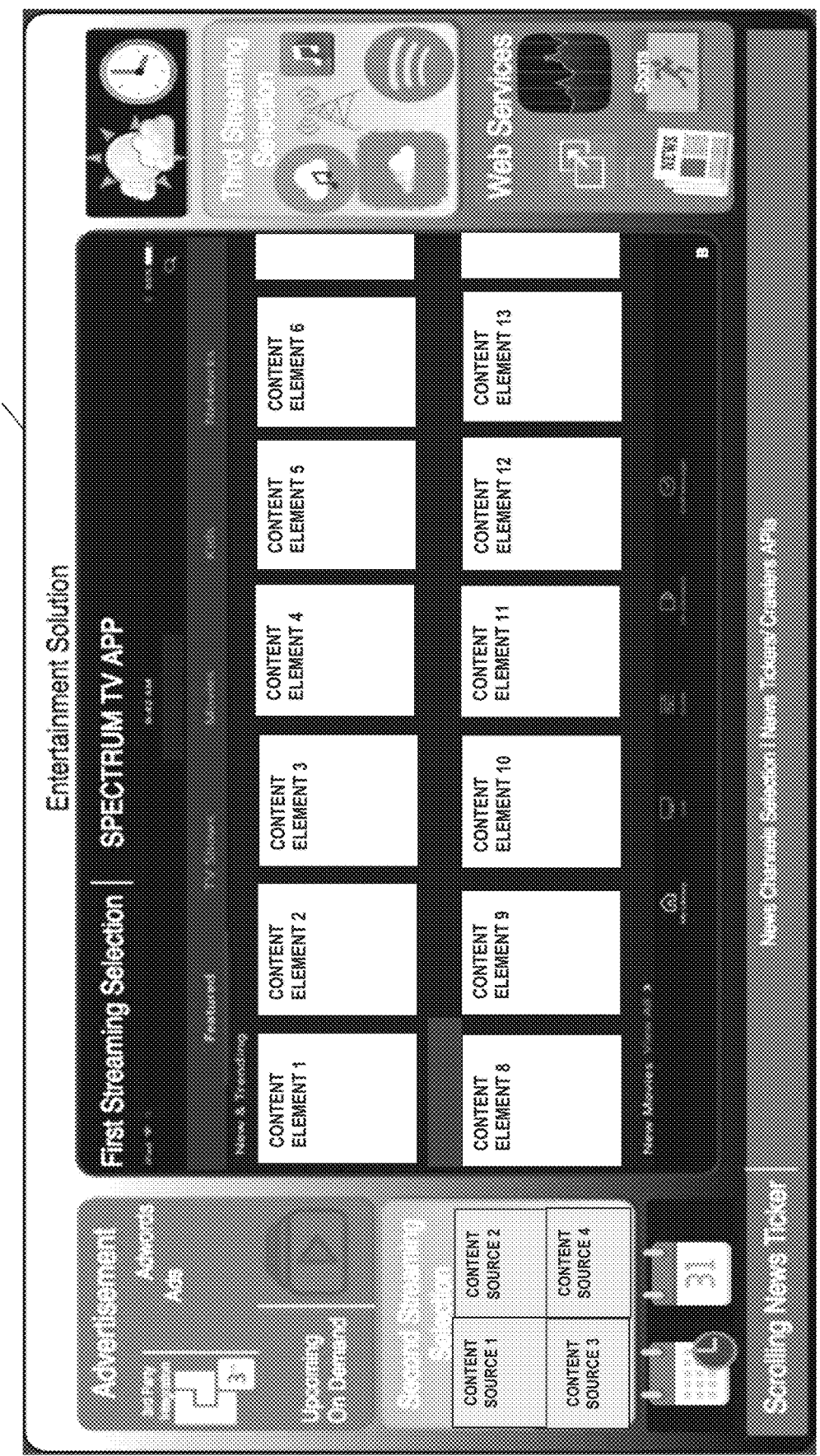
FIG. 10A is a graphical representation illustrating an exemplary implementation of the aggregated display of FIG. 10.

In some embodiments, the edge platform 313 generates the composite content stream by injecting the user content into the packetized stream carrying the network content. In some variants, the user content may be super-imposed or overlaid over the network content, including with temporal synchronization. In some variants, network content may be super-imposed or overlaid over other network content (e.g., imagery and/or audio onto a video stream). For example, the user and/or network content may be disposed within a "PIP" (picture-in-picture) type window within the network content. Multiple content elements can also be "stacked" in windows overlaid onto one another, including in one variant utilizing display element control schemes such as those described in U.S. Pat. No. 9,213,538 to Ladd, et al. issued Dec. 15, 2015 and entitled "Methods and apparatus for display element management in an information network," which is incorporated herein by reference in its entirety. In other variants, the user content and/or the network content can be configured in the fused or single media stream to be displayed side-by-side or top-over-bottom or other such composite. In yet other variants, frames of the user content may be marked for insertion into the network-sourced content, such as via interleaving. See discussion of FIGS. 10-10A provided subsequently herein.

Additionally, it is noted that, at this phase, the time reference between the network-sourced content and the user content is not temporally synchronized, and as such, in one embodiment, there is a simple overlay of one content element or stream onto the other.

At step 510, the edge platform 313 transmits the ACS to one or more entities. In one exemplary embodiment, the edge platform 313 can send the ACS to a content distribution system 383 for other viewers to consume (e.g., via social media such as YouTube, Twitch, etc.). The edge platform 313 can also send the AVS to a client device(s) 316, 318 in order for the user to view and/or subsequently control or edit the ACS.

Referring now to FIG. 6, one exemplary embodiment of a method 600 for aggregating two or more different content streams as well as integrating user controls utilizing "learned" intelligence, in accordance with the present disclosure is provided.

At step 602, the network and/or user content is received at the CPE. In various embodiments, the network-sourced content is received by the CPE 316 over HFC utilizing DOCSIS.

At step 604, the fused or single media stream with the network-sourced and/or user-sourced content is displayed at the CPE or other rendering device.

Steps 602 and 604 may be utilized consistent with the method 500 of FIG. 5. Particularly the display of the fused or single media stream may include the generation of the fused or single media stream according to any of the approaches described in FIG. 5. For example, in some exemplary embodiments, a user may watch the network content on TV/STB 316 and generate user content on another client device 318 (such as a smartphone), and upload that user content to the edge platform 313 using 5G NR services. The edge platform 313 receives the network content from the CDN 383 and is configured to combine the network and user content (uploaded via use of 5G) into a fused or single media stream. Accordingly, as the network content is received over HFC, and the user content is uploaded via use of 5G, the network content will likely be delayed in the fused or single media stream generated by the edge platform 313.

At step 606, the control signaling data is received and provided to the edge platform 313 for analysis thereby. The received control signaling indicates user input which allows the client device or user to perform certain actions such as tune to a certain channel or content source, such as where the user wants to insert or inject his or her own content (e.g., locally generated content), select a particular application (indicated by a displayed icon), or move certain content on the display. Also, as previously discussed, the user may temporally shift one constituent content stream relative to another within the fused or single media stream.

At step 608, the control signaling data is stored for subsequent use. In one embodiment, the control signaling data is stored at the edge platform 313. In another embodiment, the data is stored in a "cloud" (network) based storage device which is remote from yet accessible via a computerized user or client electronic device.

At step 610, a new fused or single media stream is generated, or the existing fused or single media stream is modified, according to the control signaling. For instance, the user may have gestured or used a voice command to delay one constituent stream relative to another stream in the composite, so as to align them temporally.

At step 612, the generated/modified fused or single media stream is received and displayed at the CPE.

At step 614, additional control signaling is subsequently received with respect to the generated/modified fused or single media stream. For instance, the user may wish to swap out two available content sources.

At step 616, the additional control signaling data is stored.

At step 618, the stored control signals (all) are utilized to produce "learned" data and e.g., extrapolate new adjustment data (e.g., new "skills" or suggestions). For example, in one embodiment, the control signaling can be correlated by the analytics engine 320 to user/premises activities (e.g., channel changes, programming selections, behavior during advertisements, purchase made by the user, etc.), and/or correlation to products, services, or content displayed or advertised to the users at the premises (i.e., how a given user responds in terms of actions, gestures, etc. when shown a product in an advertisement, or a promotion for a given content element (e.g., movie or series episode). Various artificial intelligence and machine learning algorithms may utilize the stored user input to automatically suggest or even implement actions to the user or change settings, as well as identifying commonalities across multiple different customers or sites served by the network operator or service provider. In one such aspect, the edge platform 313 through machine learning (ML) and AI algorithms in effect "learns" the patterns, preferences, etc. associated with user. As such, this learned behavior can also be applied to various operations/rules for subsequent implementation for that user/premises or others.

At step 620, a new fused or single media stream is generated or the existing fused or single media stream is modified according to the last iteration of user-generated control signaling and/or the "learned" or extrapolated data. For instance, repeated user swaps for content streams relating to live news or weather feeds would cause the AI/ML engine 320 to generate an adjustment to the then-prevailing fused or single media stream EPG objects to include more live or news-related content elements or sources. As another example, prior user UI display adjustments (e.g., resizing of windows on the UI) might cause the engine to generate adjustment data resizing certain of the display elements in the new fused or single media stream consistent with the prior user adjustments.

At step 622, the new generated/modified fused or single media stream is received and displayed.

It will be appreciated that the foregoing process 600 can be iterative and based on a prescribed amount of user input stored data, including data from other users. For example, a given configuration of the edge platform 313 may need to build a sufficient history of user interaction before it makes extrapolated ("proactive") or suggested adjustments, and in some embodiments obtains this data from the cloud (e.g., an MSO-wide historical control data database) where insufficient user-specific data is available. User-specific interaction may also be more heavily weighted than generic user data (i.e., data for a specific identified user is more germane than perhaps data from another household).

Figure 6A:
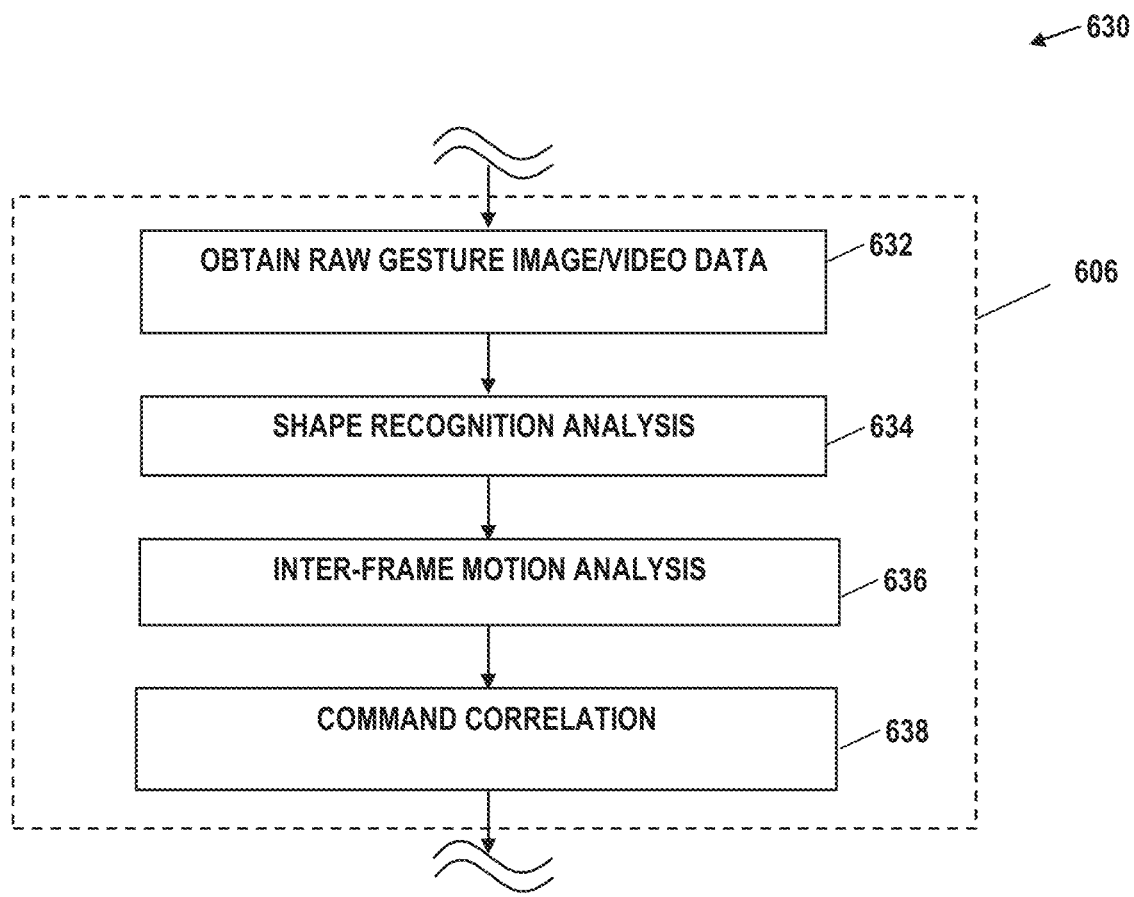
FIG. 6A is a logical flow diagram illustrating one implementation of a method of gesture data processing according to the disclosure.

Referring now to FIG. 6A, one implementation of the control data analysis of step 606 of the method 600 of FIG. 6 is provided.

The method 630 starts at step 632 at which raw gesture image or video data is obtained by the edge platform 313 from the CPE or client via the low-latency wireless backhaul. For instance, in one variant, a prescribed temporal period of video data (e.g., one second) is captured and transmitted to the edge platform. This may correlate to e.g., 60 frames of data at a 60 fps rate when encoded. It will be appreciated that the video data may be encoded at the client/CPE prior to transmission, or the unencoded data sent "raw" to the edge platform 313 for analysis (which may include encoding), depending on configuration.

At step 634, shape recognition analysis is applied. For instance, in ne embodiment, a shape recognition algorithm is executed within the engine 320 of the platform 313 to analyze the video data frames to identify one or more prescribed shapes therein (see e.g., FIG. 11 herein), such as user hands or fingers. In one variant, a user's spread out fingers are used as a shape for recognition purposes. In IR imaging based variants, the shape(s) may be recognized via IR intensity analysis; e.g., a user's fingers will radiate more heat than surrounding air, and hence the fingers can be recognized via analysis of the intensity of light recorded at certain prescribed wavelengths. Various other detection mechanisms will be recognized by those of ordinary skill given the present disclosure.

At step 636, inter-frame motion analysis of the video data is performed. For instance, motion estimation or extrapolation may be performed based on the recognized shape(s) or portions thereof. For example a fingertip portion of a given frame, represented by a group of related pixels within the image, can be evaluated algorithmically from frame to frame to determine a motion direction and extrapolate a rate (e.g., knowing the frame rate and estimating the distance traversed) to determine whether a prescribed skill has been invoked. For example, a user taking one finger and rotating it in the air in a small circle cab ne associated with a given function, and the motion of the fingertip can be determined to meet the circular pattern based on inter-frame motion analysis.

At step 638, the motion and shape data are used to correlate the observed actions of the user to a prescribed skill or command, such as "scroll through the cloud EPG listing."

Figure 6B:
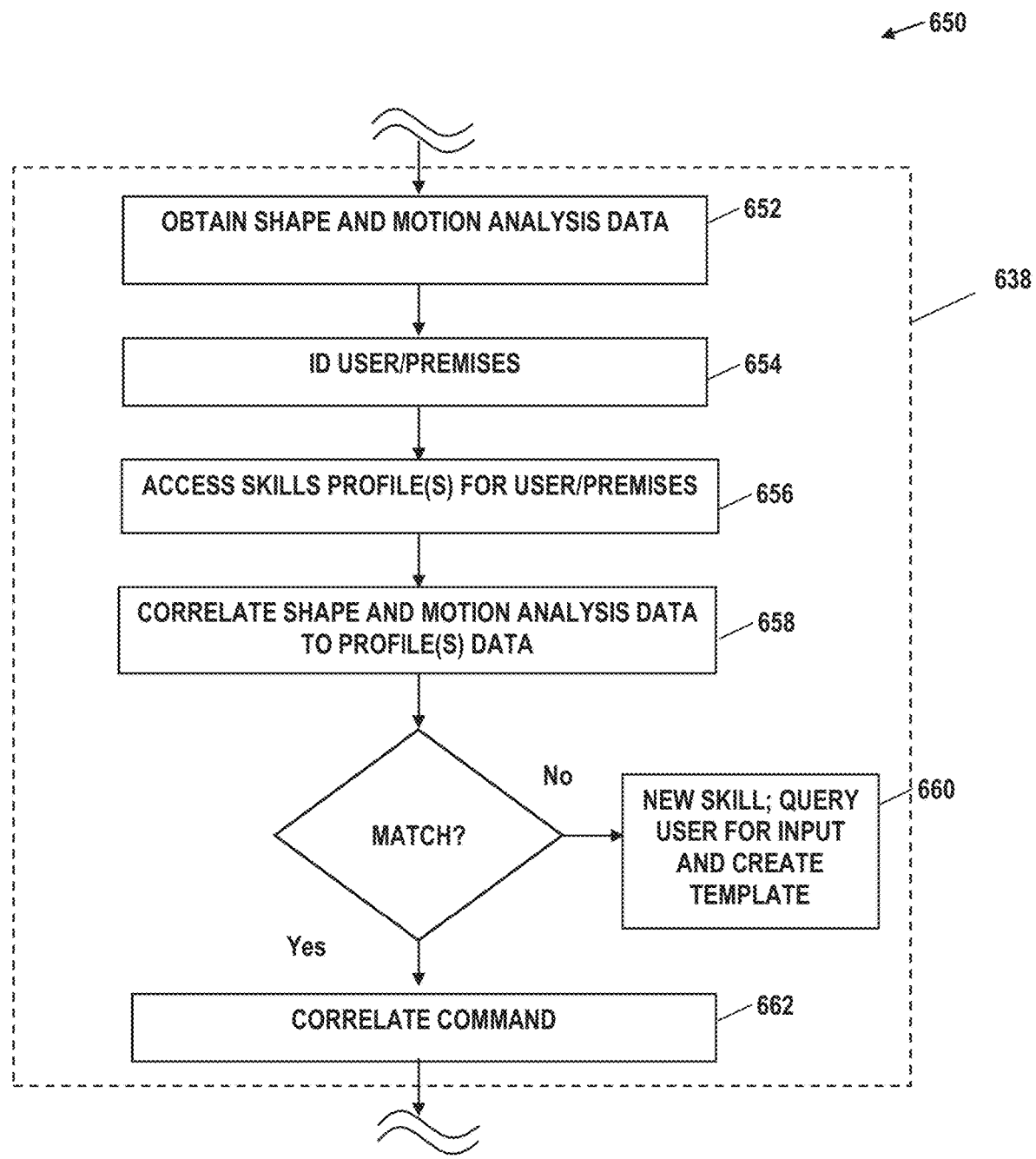
FIG. 6B is a logical flow diagram illustrating one implementation of a method of gesture data correlation to functional command(s) according to the disclosure.

FIG. 6B illustrates one exemplary embodiment of the method of step 638 of FIG. 6A. As shown, the method 650 first obtains the previously described shape and motion analysis data at step 652. Next, at step 654, the individual user and/or served premises is identified. This identification, depending on granularity, may be performed in any number of different ways, including facial recognition, lookup of the MAC address of the CPE or client device being used within the MSO subscriber database, user login information or other user input identifying themselves, voice recognition, and/or other techniques. The user may also be "retroactively" identified after the method 650 subsequently matches a particular unique gesture or voice skill to pa user template in the database (e.g., only one user has a profile which uses two hands curled up and held next to one another in front of their face for "search" command).

Per step 656, the skills profiles for the identified user(s) or premises are accessed by the platform 313, and per step 658, the shape and motion analysis data are correlated to a given user command within the profile(s) per step 662; e.g., the aforementioned curled-up fingers held next to one another may be specific to Jane Doe and correlate to the desire to perform a content database search for a title.

If no match exists, then per step 660, a new skill template is created and the user prompted via the user interface for input to define the function being invoked.

Exemplary Edge Platform Apparatus—

Referring now to FIG. 7, an exemplary embodiment of an edge platform 313 is illustrated. As shown, the edge platform 313 generally comprises a network interface 702 for communication with the content delivery network (CDN) 383, and various backend interfaces 712 for communication to other entities including for example the 5G NR infrastructure (e.g., 5GC, AMF, CBSDs, or other relevant components/processes) via the MEC gateway 367 (see FIGS. 3A and 3B), supervisory processes such as local UI/operating terminals, LANs/MANs, etc. Communications for distributing the ACS externally may also occur via the CDN network interface and/or one of the backend interfaces, depending on configuration, and may include data relating to QoS, bandwidth requirements, etc.

In one exemplary embodiment, the edge platform 313 is configured to communicate via the aforementioned interfaces 702, 712 and interposed infrastructure with the CPE (e.g., TV/STB) 316, the 5G-enabled client device 318, gateway(s) 360, and CDN 383. In particular, the edge platform 313 requests content from a headend or edge cache entity (e.g., content server) for processing thereof in order to incorporate/combine the content into a fused or single media stream for transmission to the CPE, client and/or premises gateway.

In some exemplary embodiments, the various backend interfaces 712 enable the edge platform 313 to communicate with the MSO backbone and Internet and the 5G core, the latter in order to receive the user content/input that has been uploaded/transmitted from the CPE via an IP session established over a 5G NR bearer and session.

The edge platform 313 further comprises a processor 704 and associated memory and mass storage 708. As shown, the processor 704 is configured to run at least an ACS server application 321 and analytics engine 320 from program memory.

The ACS application 321 enables the control and aggregation of the user—selected content, and combination of any user content with the network programming (and in some variants, other user content), or network content with other network programming. In some variants, user control data (such as gesture) may be included with the combined content (e.g., for user training or feedback when developing user-specific skills), and further enables presentation of the composite and user-controlled content stream. For example, the ACS server application 321 can generate and provide presentation information; generally, the presentation information dictates how the combined content is to be presented to e.g., another subscriber or set of subscribers, to the user, or even to third party processes such as advertisement engines. In one variant the edge platform 313 combines user generated data with other programming for presentation to another entity (such as another subscriber's CPE). In other variants, the edge platform 313 combines the user generated data with other user generated data to further improve targeted programming (e.g., improving targeted advertisements). Is still other variants, the edge platform 313 directly provides the user generated data to other users.

Further, in some embodiments, the ACS application 321 enables the edge platform 313 to analyze user input associated with the respective content, add or remove content to/from a stream, create a multicast, cause content to be forwarded or delayed, and otherwise monitor network conditions and requests for content. The aforementioned analysis of user input may occur via receipt of control signaling (e.g., receipt of data indicative of detected hand gestures), evaluation of requests received from the client devices, pre-stored operator determined rules, evaluation of network conditions, etc.

As shown, a user profile and template database 710 may be stored at the mass storage 708 of the edge platform 313; alternatively the database may be located remote to yet in communication with the edge platform 313 (e.g., virtual/cloud storage). Additionally, although illustrated as an individual applications 320, 321 running on the platform 313, it is appreciated that the foregoing functionalities may comprise an individual application, or alternatively one or more distributed applications running on a plurality of entities in data communication with one another (including one or more network entities); e.g., the network may be configured with a first server for a first application/function, a different server for a second application/function, and so forth.

An operational/business rules engine (not shown) in various embodiments enables the edge platform 313 to define rules for, e.g., (i) determining how to aggregate content and integrate control with the content, (ii) determining which content can be "aggregated with" and which controls can be "integrated into" (i.e., what is eligible or accessible to that particular CPE or subscription account for combination with user upload data, or more generally what themes, genres, etc. are eligible (such as where "first run" or HPoV content is not eligible, but other types of content are, or where particularly sensitive, restricted or controversial content is not eligible); (iii) user privileges in conjunction with the ACS, based on e.g., subscription plan or tier, and yet others.

A servlet or other similar application may also be provided to facilitate communication between the various applications and one or more content source servers. The servlet, in one embodiment, acts as a proxy for communication between the platform 313 and various media applications or sources also located at or in communication with the headend. Users associated with the CPE 316 or client 318 may also access the media features and applications using client software applications running on the client device.

In another implementation, individual ones of the applications are in communication with an Internet host server in order to obtain data therefrom, such as via a gateway device located at e.g., the headend of the network. In other words, the gateway device requests and receives Internet data and/or content from the host servers on behalf of the edge platform application(s).

Exemplary CPE—

Figure 8:
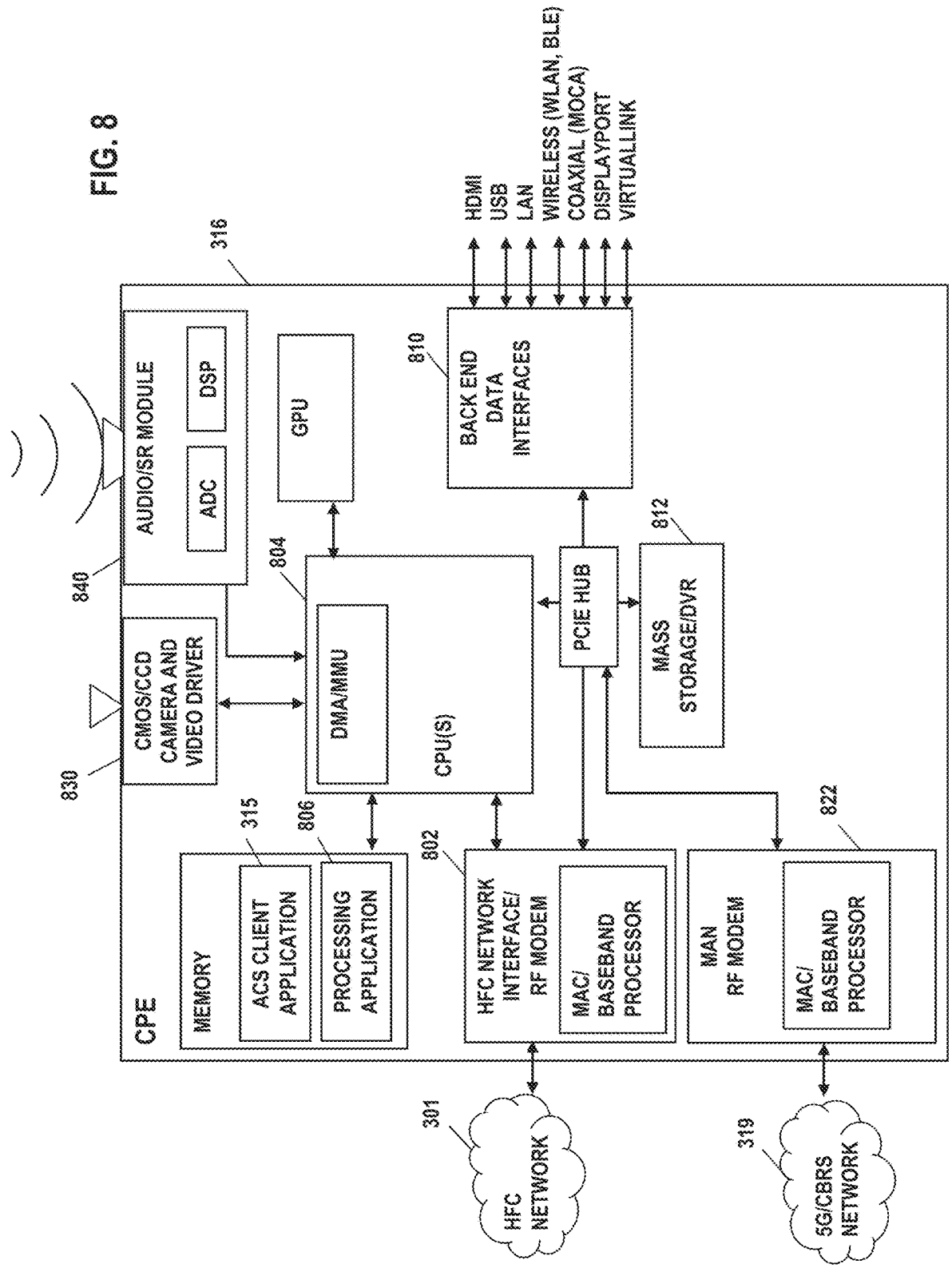
FIG. 8 is a functional block diagram illustrating one embodiment of a CPE for use in delivering content over HFC to users according to the present disclosure.

Referring now to FIG. 8, one exemplary embodiment of the CPE 316 is illustrated. Exemplary incarnations of the CPE include settop boxes (e.g., DSTBs), television sets (e.g., Smart TVs), laptop and desktop computers, personal media devices (PMDs), and multimedia gateways. As shown, the CPE 316 comprises an HFC network interface 802, processor 804, MAN RF modem 322, mass storage 812, memory, and backend interfaces 810, as well as camera module and associated video driver 830 (for generation of user command or input content data), and audio/speech recognition module 840 (for generation of recognized speech data, each to be forwarded to the edge platform 313 via the low-latency link. It will be appreciated that while indigenous speech recognition capability is shown in the embodiment of FIG. 8, the CPE may be configured to merely digitize the user's speech for transmission as "unrecognized" raw speech data samples to the edge platform or a designated cloud proxy process for conducting recognition (e.g., a Nuance or similar cloud-based third party provider).

The network interface 802 in one embodiment may comprise an RF tuner/modem (discussed below), or a cable modem, such as e.g., a DOCSIS 3.0 compliant cable modem of the type discussed in "*DOCSIS® 3.0 Management Features Differences Technical Report*" CM-TR-MGMTv3.0-DIFF-V01-071228 and "*DOCSIS 3.0 OSSI Configuration Management Technical Report*" CM-TR-OSSIv3.0-CM-V01-080926, each of which is incorporated herein by reference in its entirety.

The network interface 802 of the CPE 206a further comprises one or more QAM tuners configured to receive content from the HFC network 301. The RF tuner(s) may comprise traditional video RF tuner(s) adapted to receive video signals over, e.g., a QAM. For example, the RF tuner(s) may comprise one or more tuners, a demodulator, decryption module, and demultiplexer of the type well known in the art, although other configurations may be used. The number and type of QAM tuners utilized in the CPE 800, as noted above, may be varied so as to ensure tuning across the entire available spectrum. Alternatively, different classes of devices may be provided each class having a different tuning range capability.

For example, the CPE 316 may include a wide band tuner, such as that discussed in previously referenced co-owned, co-pending U.S. Patent Application Publication No. 20060130113 entitled "METHOD AND APPARATUS FOR WIDEBAND DISTRIBUTION OF CONTENT" filed Dec. 14, 2010 and issued as U.S. Pat. No. 9,723,267 on Aug. 1, 2017. The wideband tuner arrangement enables the CPE to receive content associated with one or more program streams distributed across two or more QAMs, including so-called "bonded channels." Additionally, the RF tuner(s) may incorporate functionality to modulate, encrypt/multiplex as required, and transmit digital information for receipt by upstream entities such as the CMTS.

The CPE can assume literally any discrete form factor, including those adapted for desktop, hand-held, or wall-mounted use, or alternatively may be integrated in whole or part (e.g., on a common functional basis) with other devices (such as the 5G-enabled client device) if desired. Additionally, the CPE 206a may include other elements and interfaces such as for example an interface for the HomePlug A/V standard which transmits digital data over power lines, Wi-Fi capability, a PAN (e.g., 802.15, Bluetooth Low Energy (BLE), or other short-range wireless interface for localized data communication), HDMI interface, DisplayPort, VirtualLink VR-enhanced data and power link, etc.

The CPE processor 804 is configured to run a processing application 806 and the client ACS application 315 thereon from program memory. The processing application 806 enables the CPE to perform the processing, display the received content. In one variant, the processing may include decode and rendering. In another variant, the processing may include de-encapsulating received IP content from a first media file container format and subsequently re-encapsulating the content to a second media file container format, transcription, translation, and/or transcoding.

Additionally, although illustrated as an individual applications 806, 315 running on the CPE, it is appreciated that the foregoing functionalities may comprise an individual application, or alternatively one or more distributed applications running on a plurality of entities in data communication with one another (including one or more network entities).

Figure 8A:
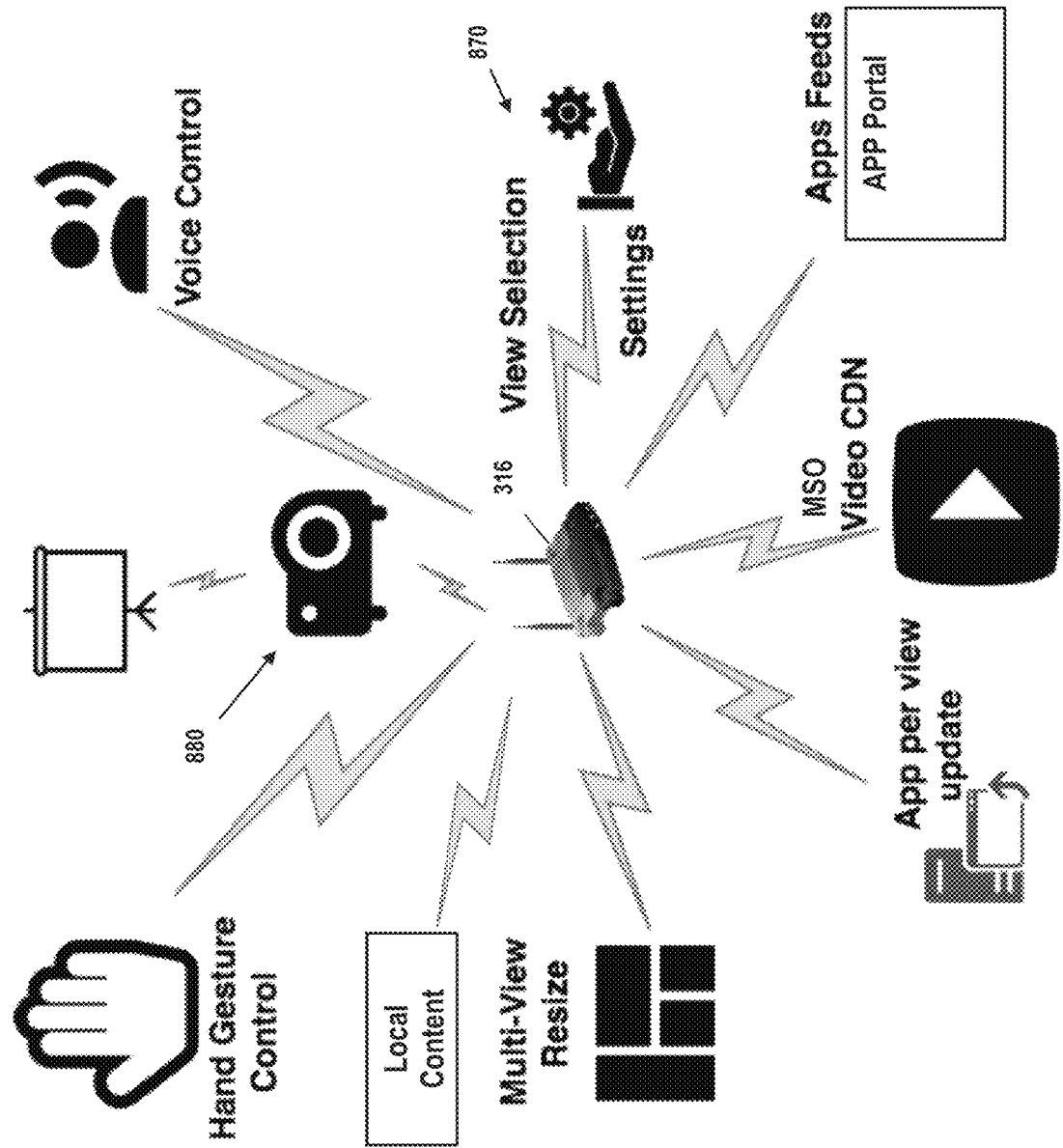
FIG. 8A is a graphical representation of the capabilities and interactivity of the exemplary CPE of FIG. 8.

FIG. 8A is a graphical representation of the capabilities and interactivity of the exemplary CPE 316 of FIG. 8, including interaction with local (premises) digital projection systems 880, and also user-commanded utility and settings functions 870 which may be advantageously disposed within the edge cloud platform 313 (or another edge cloud entity). For instance, in one embodiment, the projector apparatus 880 comprises a near-field projector, capable of projecting high definition video content to a wall, mounted either directly on an AC wall outlet or on a tabletop just next to the wall without separation to the projected wall. In this fashion, the user is provided significant transportability and flexibility in display technology; i.e., the user does not have to be tethered to a typical display system such as an LCD television or display monitor. The projector may be wirelessly communicative with the CPE (or in fact the client device 318 of FIG. 9 discussed below), such that the user can simply place the projector near a suitable surface and render the received content (e.g., aggregated content stream) without any wires or need for other supporting components or devices.

Exemplary 5G-Enabled User Device—

Figure 9:
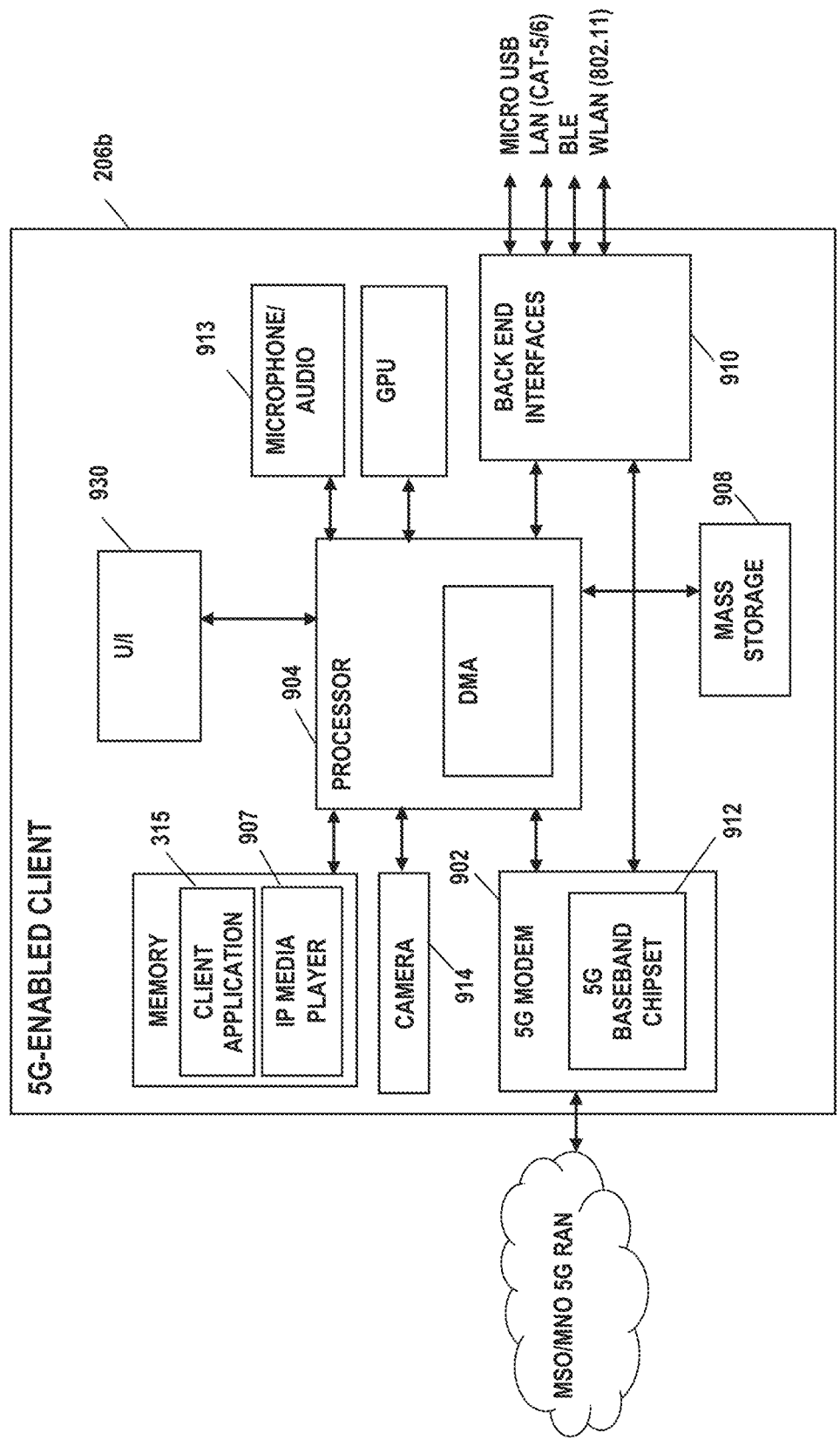
FIG. 9 is a functional block diagram illustrating an exemplary embodiment of a 5G-enabled client device according to the present disclosure.

An exemplary 5G-capable user device 318 useful with the present disclosure is illustrated in FIG. 9. The 5G-capable client device may comprise any device capable of receiving/transmitting and encoding/decoding IP packetized content via use of 5G NR services (e.g., NR-U), whether for display thereon, or for recording, display, or storage on a device in communication therewith. Exemplary devices include laptop and desktop computers, cellular smartphones, tablets, personal media devices (PMD), and other mobile devices, although other types of devices (fixed, IoT, etc.) may be substituted.

As shown in FIG. 9, the 5G-enabled client device generally includes e.g., a 5G NR network interface 902, a processor 904 and associated storage 908, and a plurality of various back end interfaces 910 for communication with other devices, such as WLAN, BLE, Ethernet, HDMI, and USB/micro-USB or USB OTG.

In the illustrated configuration, the 5G network interface 902 enables communication between the 5G-enabled client device 318 and the 5G RAN via the access node 314 (e.g., gNB). In one embodiment, the 5G-enabled client device includes a 3GPP 5G NR-capable user equipment (UE) baseband chipset 912. The UE chipset 912 is configured to receive digital I/Q synchronization signal(s) for 5G, enabling downstream and upstream modes of the respective TDD carriers. The 5G interface may also be used in one implementation to support the signaling interface between the client device 318 and the platform encoder 322.

In various embodiments, the processor 904 may be configured to load and run a media player 907, such as an HTML5 video player, in order to play the received/captured content. DRM and/or Conditional Access (CA) functionalities may also be implemented and supported at the media player 907.

In one embodiment, the processor 904 may be configured to cause display of aggregated content via a user interface 930.

The processor 904 also runs a client application 315 for requesting, capturing, sending, and/or displaying content, as well as detecting/receiving user input (e.g., gesture or voice data). The client application 315 may be in data communication with camera 914 in order to capture media and/or detect gestures at the edge while utilizing embedded local-edge compute capability at the capturing device (including the camera), as well as the microphone/audio module 913 to capture audio. The client application 906 can also be configured to upload content if desired, and send control signaling (e.g., control signaling-A 456 as shown in FIG. 4) to the edge platform 313.

It will be appreciated that in exemplary embodiments of the system architecture described previously herein, the corresponding video feeds are processed in real time, and hand gesture input type is inferred locally at the premises device (local platform). In such embodiments, merely the control command is sent to the cloud processing entity to encode a new video stream. That is, hand gestures are sent only as e.g., hashed control messages to the cloud (no actual video or image data relating to the captured hand gesture is transmitted to the cloud). Advantageously, this approach allows for enhanced user privacy aspects; control message data is "non-privacy invasive" in that (i) no image data is transmitted from the premises, and hence no imagery of the user, their premises, or their actions ever leaves the premises, and (ii) the command data that is transmitted is a derivative or inference from the actual user action/imagery, and hence (even without hashing) cannot be reverse-engineered surreptitiously to obtain any meaningful data relating to the user (i.e., there is no user-specific context derivable from the transmitted command based on the aforementioned derivation).

In yet another embodiment, the 5G-enabled client device further comprises a SSD, flash memory (e.g., NAND or NOR flash) or hard drive in communication therewith or integrated therein which may act as a digital video recorder (not shown).

User Interface (UI) Platform—

In various embodiments, the edge platform 313 makes use of a "UI platform" within the served premise 464; specifically, the UI platform is a user interface with an application/logic configured to utilize the "fused" processed content delivered from the edge platform 313. For example, the UI can be utilized for (i) displaying a fused or single media stream (e.g., a stream that is essentially an aggregation of various streams, which may include streams carrying various network-sourced or user-generated content), and (ii) enabling direct user interaction with content (e.g., utilizing a touch-enabled client (e.g., capacitive touch pad or the like) and/or a gesture recognition/feedback process as well as a voice control function). The direct interaction includes interaction (including manipulation) with content by a single user via any of the aforementioned mechanisms; i.e., gesture, voice and/or touch. This approach advantageously enables utility and appeal for a wide spectrum of users; some may prefer one or two modalities over others, some may be incapable of using various modalities, etc.

An exemplary UI 1010 useful with the present disclosure is illustrated in FIG. 10. As shown, various types of content is display in aggregation. Such content can be provided from various third party and/or internal (i.e., MSO owned or operated) content sources 203. For example, content may be received from a local, regional, or network content library. Alternatively, content may be received from linear analog or digital feeds, as well as various third party content sources, Internet content sources 203a (such as e.g., a web server) providing Internet content. Other IP content may also be displayed, such as voice over IP (VoIP) and/or IPTV content. Content may also be displayed from subscriber and non-subscriber devices (e.g., a PC or smartphone-originated user made video) and included on the downlink to a given CPE (as well as that CPE or an associated device originating similar content itself, as described elsewhere herein).

In one variant, the UI platform 230 is configured for operation with the edge platform 313. In one variant, an application is downloaded onto the user platform (e.g., UE or VR system), the application enabling real-time receipt from the edge platform 313 (indirectly via the service provider infrastructure) of streamed high-quality video and other relevant data, as well as control functions via the UI.

For example, the edge platform 313 (performing, in one variant, as a cloud-based entity) processes the aggregated data/controls and generates output, which may include e.g., RTSP-based real-time video and data feeds to the UI application (e.g., on a user's smartphone or PC or other device such as VR/AR headset). In one implementation, 5G NR bearers (e.g., NB-IoT or other) are utilized for at least portions of the backhaul and delivery to the UI platform with minimal latency. In another implementation, one or more 5G NR "slices" are established to support the site-to-cloud-to-user channel.

FIG. 10 illustrates an exemplary mosaic of various content displayed via the UI 1010 useful with the present disclosure. As shown, in one embodiment, a main content element ("content stream 0") can be positioned for example, in the center of the UI 100, and multiple different content elements (1-6) are positioned around it. It will be appreciated that while the term "stream" is used in the embodiment of FIG. 10, any given element can represent a temporally changing stream, static data, iconic representations, or yet other types of indications. For example, content stream 2 may include a category of advertisements (see FIG. 10A) from one source, and content stream 4 may include a category streaming selection from another source. As previously described, the various content elements or streams may be tiled, windowed, or managed as a visibility stack, including association with application context (e.g., the user may "activate" an element as the in-focus element for, e.g., interaction therewith via gesture or vice or touch input.

It is noted that one salient difference between the "mosaic" of FIG. 10 and the mosaics of the existing art (e.g., a display of multiple security camera feeds) is that the mosaic of FIG. 10 displays various content elements carried on a single fused or single media stream that is an encoded aggregation of various constituent or primary streams which previously carried the various content elements, respectively. In contrast, the mosaics of the existing art consist of multiple separate streams merely displayed together.

In one exemplary embodiment, the display region consumed by the UI 1010 is managed according to inputs provided by the user via learned or templated skills relating to hand gestures, as described in greater detail below with respect to FIGS. 11A-11E.

An exemplary implementation of the UI 1010 of FIG. 10 is shown in FIG. 10A.

Gesture Recognition/Feedback—

Referring now to FIGS. 11A-11E, exemplary methods of user interaction with the previously discussed detection and control system, and exemplary user gestures that may be used consistent with the "skills" described herein, are shown and described in detail.

At a high level, the local compute unit (e.g., integrated or connected with the premises CPE) is in one implementation responsible for continuously detecting and inferring the hand gestures of the user, and for sending the "recognized" gesture commands to the micro-edge compute platform (and consequently to the macro-edge node or platform supporting it). In this fashion, operation is somewhat analogous to cloud-based speech recognition systems, in that detection of the gesture is performed locally, but actual recognition and contextual processing is performed remotely, since the latter requires significant processing capability. As processing power increases over time, however, it is envisaged that both detection and at least portions of the context/recognition processing may be performed locally at the CPE.

The local compute unit (e.g., premises CPE) keeps track of each detected command, and validates the gesture selection after having confirmed a suitable level of certainty that the hand is steady, and that the detection did not happen during normal hand movements of the user. In one implementation, a temporal stability window is specified such that the gesture/motion must persist for a prescribed period of time before a detection event is registered. In another implementation, the speed of the motion is determined (e.g., via angular displacement over time, or based on distance relative to a known metric such as the user's previously entered hand dimensions (which is particularly useful in cases where the distance of the user from the detection device is unknown, and hence the same angular displacement may correlate to different velocities for different user ranges from the device). Various other schemes will be appreciated by those of ordinary skill given the present disclosure. Moreover, as previously noted, the subset of "hot" or active gestures at any given time may be controlled (whether by the user or within the system programming by the MSO), such that the input gesture library is limited and tailored to specific users, contexts, or for other reasons (e.g., to limit false detections).

In operation, the detected gesture inputs by the user are converted to packets which are transmitted from the local compute platform (e.g., CPE) and the micro-edge platform. A given hand gesture will control the single fused content stream (e.g., composed of edge-cached or local content), then the content from the macro-edge platform will generally not be required to be changed. Conversely, if a hand gesture will control the macro-edge content, then the hand command will be transmitted from the micro-edge platform to the macro-edge platform (e.g., via interposed wireless or other transport of suitable latency) and the encoding of the content is accordingly changed at the CDN level.

Figure 11A:
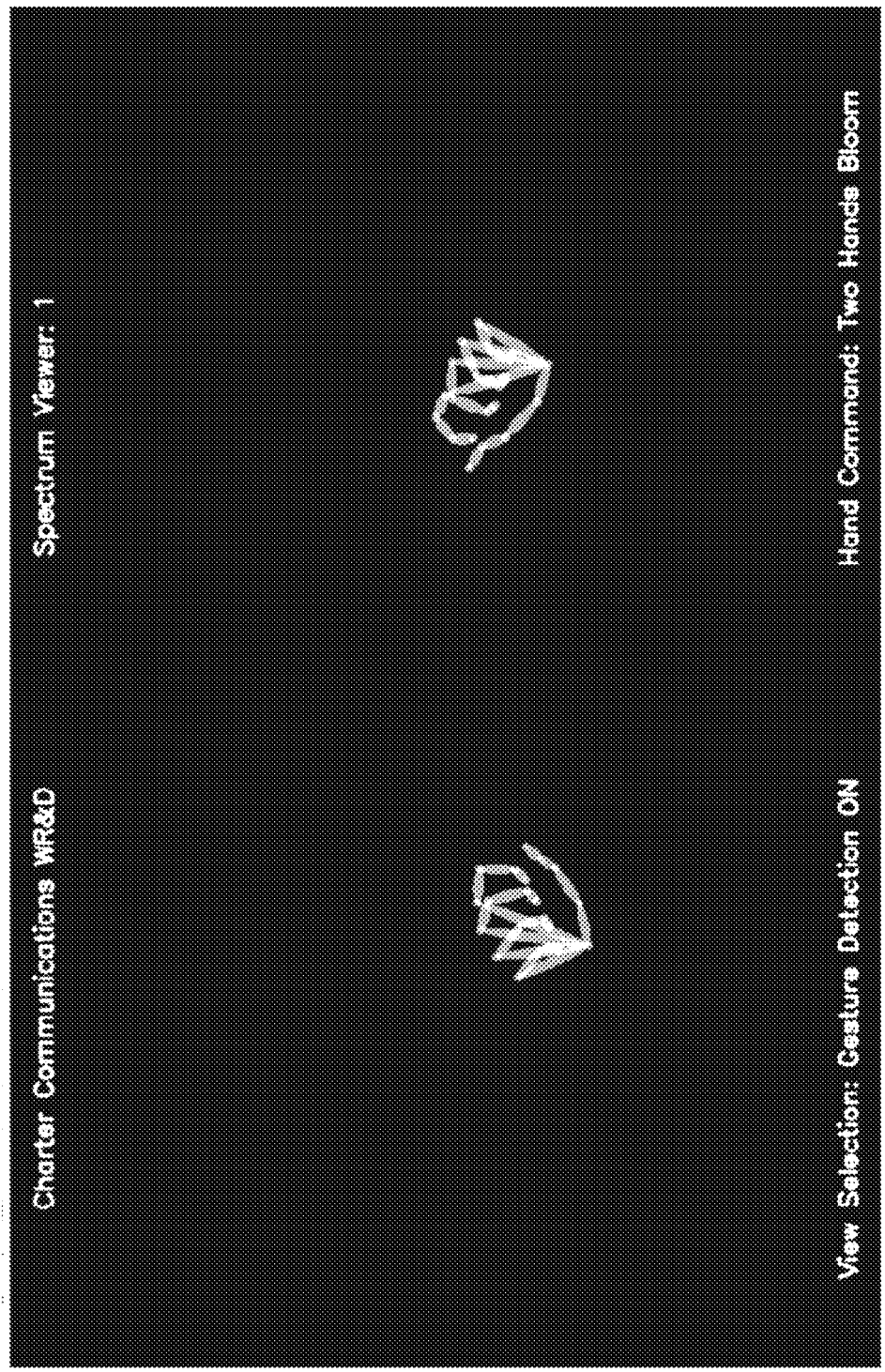
FIGS. 11A-11E are graphical representations illustrating exemplary embodiments of gestures used in control of the edge platform according to the present disclosure.
Figure 11B:
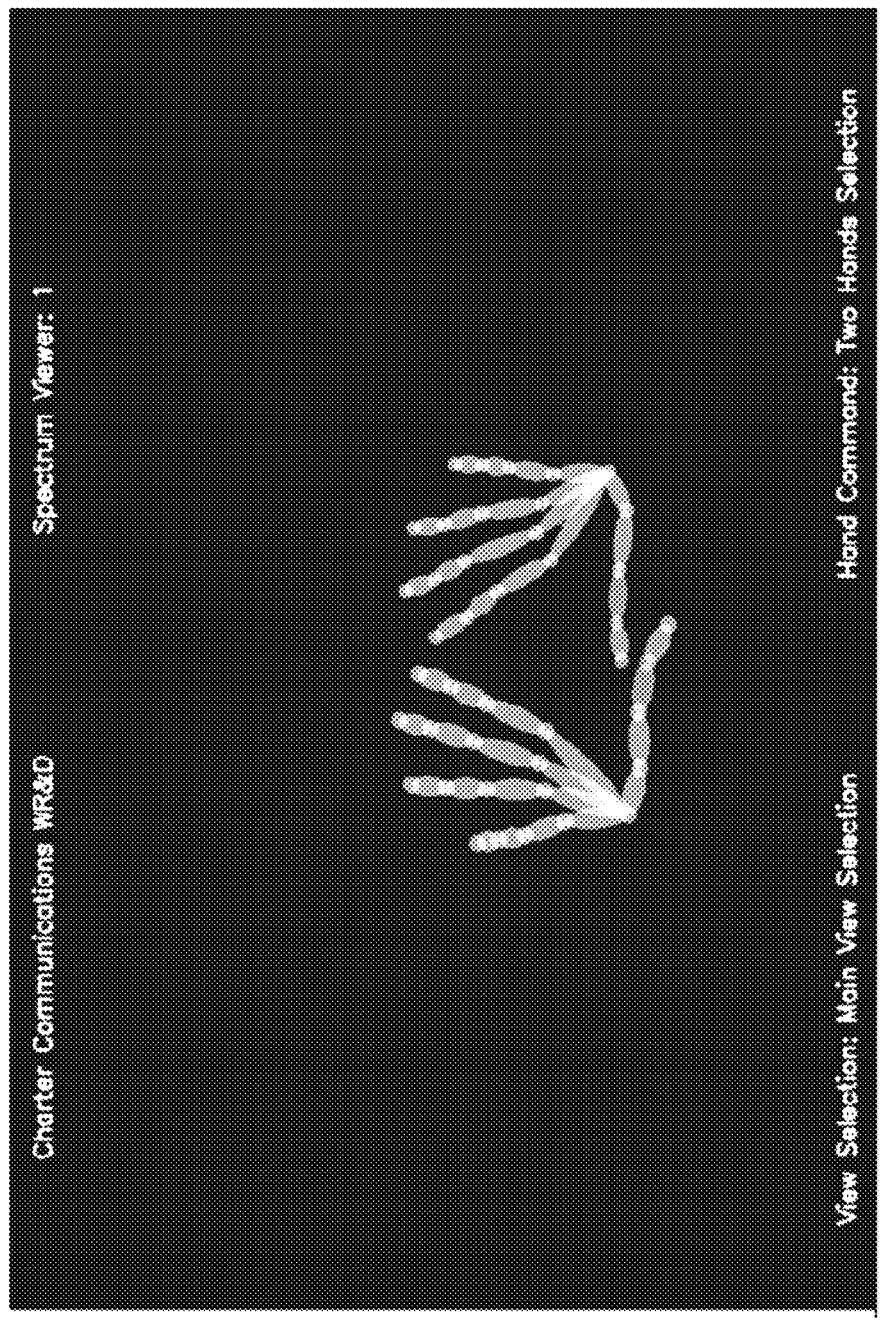

One possible initialization or activation command is shown in FIG. 11A, wherein the user has curled the four primary fingers of each hand (leaving thumbs uncurled), with the two hands spread apart from one another, so as to input the "Hand Gesture Mode "On" command (i.e., turn on gesture recognition). Note that even when operating in gesture "Off" mode, the exemplary embodiment of the recognition system is configured to recognize a limited set of "hot key" or activation gestures such as that shown in FIG. 11A, so as to obviate the user having to utilize other input modalities such as speech or manual tactile input to enable the complete set of gesture-based functions.

Once the local detection process detects the designated "On" gesture (e.g., two-hand "bloom" motion, as shown in FIG. 11A), the local compute process is invoked to track the complete or full set of hand gesture commands, and translates the view selection inputs received from the user for transmission and implementation of the associated commands, thereby enabling the user to interact with the single fused video stream with multiple views in an effectively real-time basis.

Likewise, when the user wishes to turn off the gesture mode (FIG. 11E), a two-hand "bloom" can again be used; i.e., in a toggle fashion such that the first bloom flips the mode form current state (e.g., Off) to the other state (e.g., On), and the second identical bloom flips the state again. Alternatively, a "reverse bloom" (i.e., where the user contracts their fingers to their hands as time progresses) as a unique "Off" gesture. Various other approaches will be recognized by those of ordinary skill given the present disclosure.

After the "On" gesture is received and processed, the two-hand selection command (FIG. 11B) is then invoked by the user to access the main center view content offered through e.g., the MSO CDN macro-edge compute platform, as shown in FIGS. 10 and 10A.

For example, this gesture command would be interpreted by the edge cloud platform 313 as the user wishing to make the main frame or element "in focus" and activated for purposes of subsequent interaction. This "shape" can be used, whether in conjunction with requisite movement of the user's hands over time (such as to filter unintended command inputs), or alone, as a basis for correlation to an action to transmitted from the edge platform 313 to a supporting function or process. Notable, as shown, the individual fingers may also be resolved as to shape/position, thereby enabling a larger number of possible commands and permutations (e.g., the same user gesture except with the thumbs folded inward) could refer to another command. When coupled with different possible motion requirements (e.g., up/down, left/right, circle motion, polygon shapes such as drawing a triangle in air, finger "wagging,") and optional voice command input (either contemporaneously or within a prescribed time period of the gesture input), a large number of different possible command can be learned and associated with particular skills by the edge platform 313. Moreover, using the aforementioned skills and training approach, the user can themselves customize these command as desired.

Figure 11C:
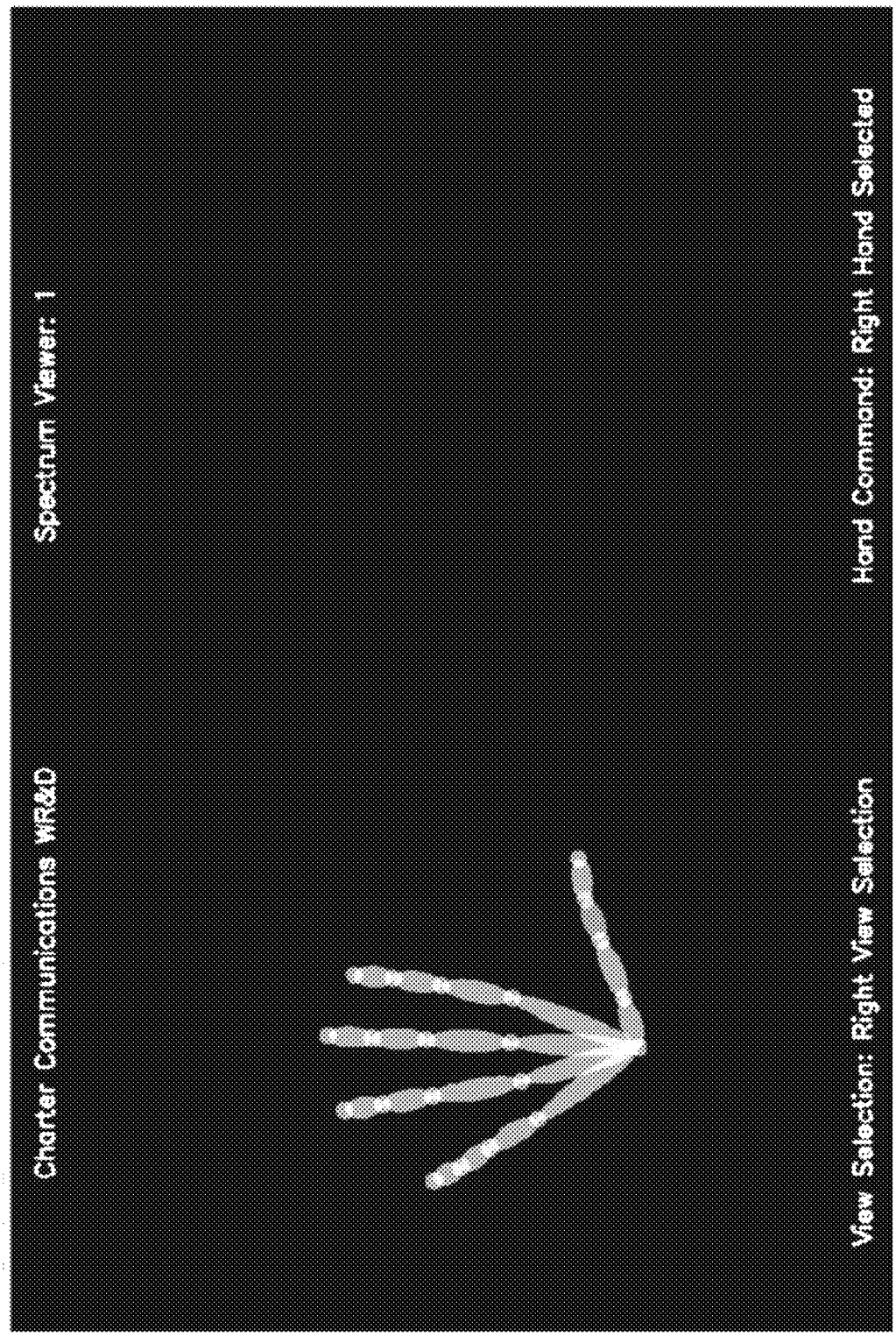
Figure 11D:
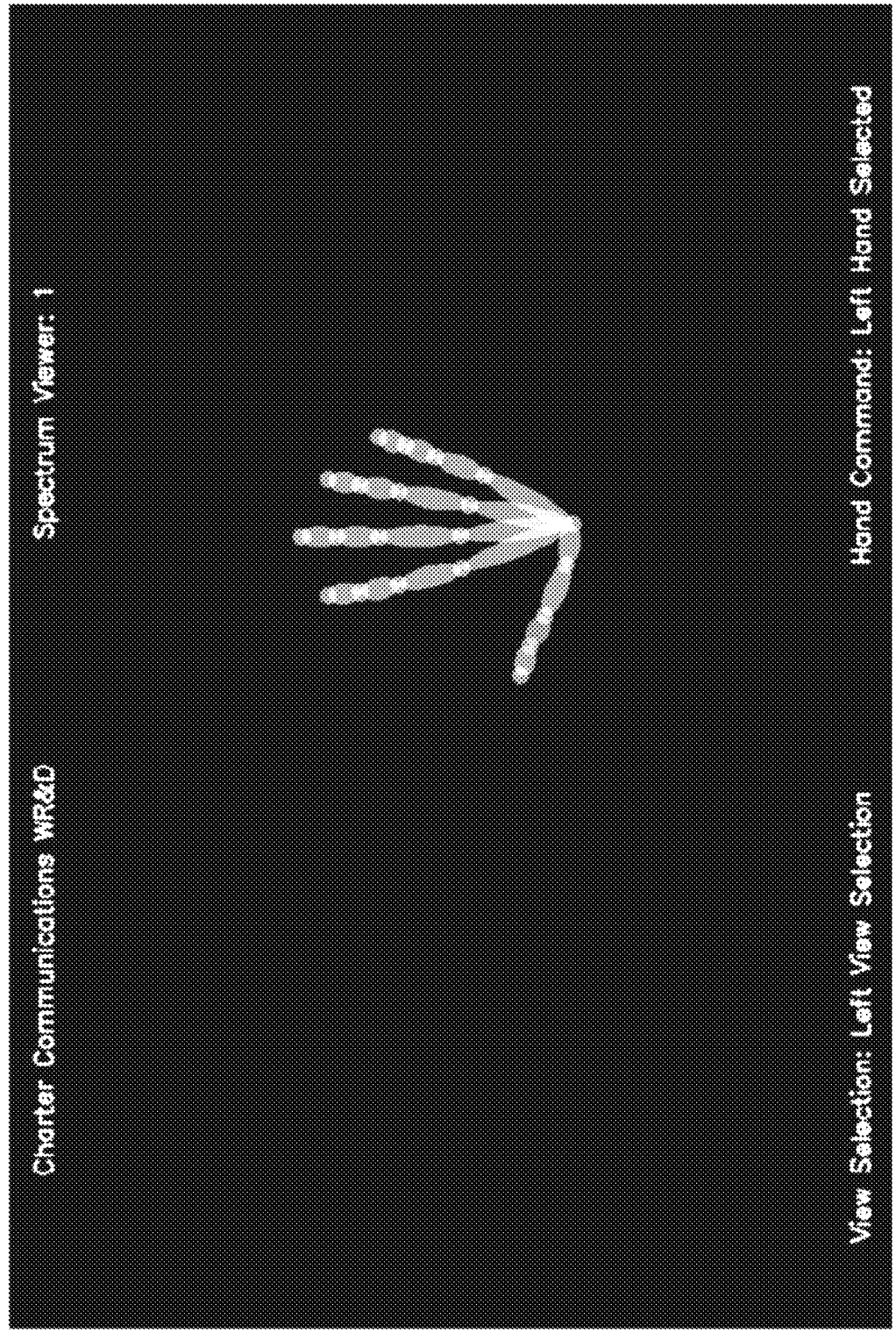
Figure 11E:
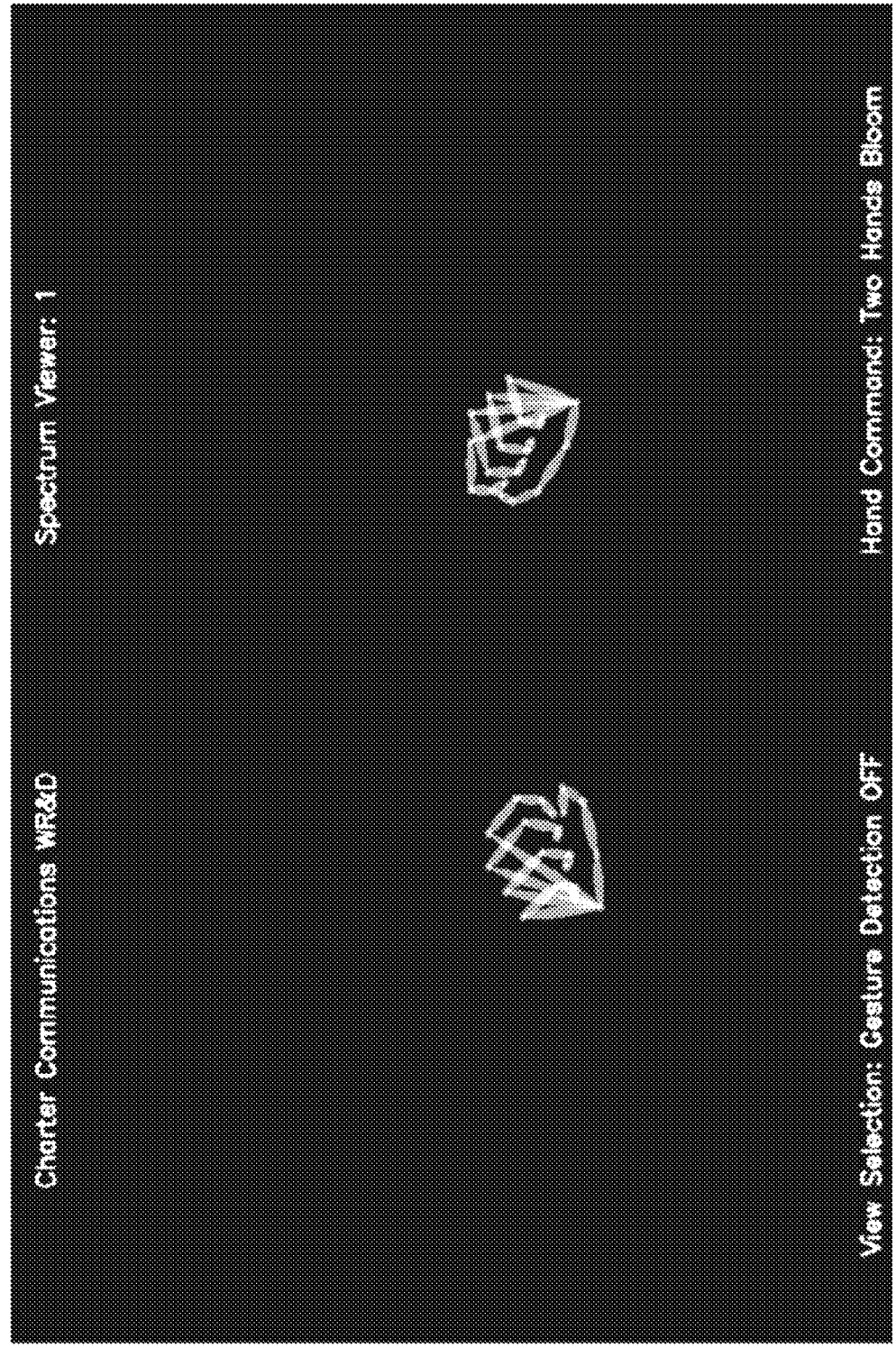

As shown in FIG. 11C, a single raised hand with fingers spread apart on a prescribed hand (here, the user's right hand, shown as viewed from the recognition device) may comprise another command such as audio volume increase or decrease (e.g., depending on whether the user drags the raised finger up or down over the prescribed gesture time interval (e.g., one second).

In one embodiment, the right hand (FIG. 11C) or left hand (FIG. 11D) selection is used to control ancillary content (e.g., popular regional content) that is surrounding the center or primary view of FIGS. 10 and 10A, and being processed in the micro-edge platform for that premises.

It will also be appreciated that skills for the UI and edge platform 313 may be borrowed from other devices or known interface paradigms for consistency. For example, a user of particular tablet or smartphone may be used to "swiping" to one side to progress through a series of images. Such swipe movement is intuitive, and the user may not wish to "relearn" or remember a new command for the UI 1010, but rather utilize a pre-existing command that is generally ubiquitous (thereby also enabling e.g., other users to intuitively use the interface in their absence). As such, the present disclosure contemplates a library of command and skill templates maintained by e.g., the MSO at the edge platform 313 from which a user can select. Conversely, the user may wish to create their own unique gestures and/or audio commands to purposely frustrate use by others (e.g., children as a means of parental control).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized network server apparatus configured to aggregate and distribute digitally rendered content via a fused or single content stream to one or more users of a content delivery network, said computerized network server apparatus comprising:
   a storage entity;
   at least one network interface; and
   a digital processor apparatus in data communication with the storage entity and the at least one network interface, the digital processor apparatus configured to run at least one computer program thereon, said at least one computer program comprising a plurality of instructions which are configured to, when executed:
      receive first digital content via a first transport mechanism;
      receive second digital content via a second transport mechanism;
      generate the fused or single content stream, the fused or single content stream comprising at least the first and second digital content;
      cause provision of the fused or single content stream to the one or more users;
      transmit one or more control signals to a first computerized client device associated with the one or more users, the first computerized client device configured to transmit the one or more control signals to a second computerized client device associated with the one or more users;
      receive, from the second computerized client device and based on receipt of the one or more control signals thereat, control signaling relating to the fused or single content stream;
      wherein (i) the transmission of the one or more control signals to the first computerized client device, (ii) the transmission of the one or more control signals to the second computerized client device, and (iii) the receipt of the control signaling, create a feedback loop for the computerized network server apparatus to dynamically estimate a delay factor;
      cause modification of the fused or single content stream, in accordance with the delay factor, so as to generate a modified fused or single content stream; and
      cause provision of the modified fused or single content stream to the one or more users of the content delivery network.

2. The computerized network server apparatus of claim 1, wherein the computerized network server apparatus comprises a cloud-based data aggregation and analytics computerized process configured to (i) ingest a plurality of different content from a plurality of different sources, and (ii) encode the plurality of different content via use of a common encoder process as part of said generation of said fused or single content stream.

3. The computerized network server apparatus of claim 1, wherein the first and second transport mechanisms each comprise an Real Time Streaming Protocol (RTSP)-controlled real-time video or data feed, and the computerized network server apparatus is further configured to utilize the RTSP-controlled real-time video or data feed to generate the fused or single content stream, the fused or single content stream comprising an RTSP-controlled stream.

4. The computerized network server apparatus of claim 1, wherein the fused or single content stream comprises a plurality of IP (Internet Protocol) packets, and the provision of the fused or single content stream to the one or more users comprises provision via a TCP (Transport Control Protocol).

5. The computerized network server apparatus of claim 1, wherein:
   the computerized network server apparatus is part of a micro-edge compute platform further configured to support cloud-based processing of gesture command data received from at least one computerized client device associated with the one or more users; and
   the cloud-based processing of the gesture command data comprises:
   (i) a determination of an association of the gesture command data to a frame rate, the delay factor comprising the frame rate; and
   (ii) utilizing the frame rate to determine at least one aspect of a gesture associated with the gesture command data, the gesture configured to implement one or more functions associated with the one or more control signals.

6. The computerized network server apparatus of claim 1, wherein the control signaling is received via a 5G NR (Fifth Generation New Radio) transport in data communication with the computerized network server apparatus via the at least one network interface.

7. The computerized network server apparatus of claim 6, wherein the 5G NR transport comprises one or more 5G NR slices established to support transmission of the control signaling to the computerized network server apparatus.

8. Computer readable apparatus comprising a non-transitory storage medium, the non-transitory storage medium comprising at least one computer program having a plurality of instructions, the plurality of instructions configured to, when executed on a digital processing apparatus, cause a computerized controller apparatus to:

receive first control data comprising gesture command data indicative of a gesture made by a user with respect to at least a portion of a plurality of digitally rendered content, the plurality of digitally rendered content originating from respective ones of a plurality of sources;

generate a composite media stream based at least on the first control data, the generation comprising: (i) a determination, based at least one the gesture command data, of at least one of a shape or motion of the gesture and (ii) an adjustment of the at least the portion of the plurality of digitally rendered content in accordance with the shape or motion of the gesture, the adjustment comprising a temporal synchronization of at least one of the plurality of digitally rendered content with at least one other one of the plurality of digitally rendered content; and stream, via a streaming protocol, the generated composite media stream to a computerized client device associated with a user of a content distribution network.

9. The computer readable apparatus of claim 8, wherein the plurality of instructions are further configured to, when executed on the digital processing apparatus, cause the computerized controller apparatus to:

cause storage of the first control data at a computerized storage entity;

receive second control data relating to the generated composite media stream;

utilize the first and second control data in a machine learning algorithm to extrapolate adjustment data;

based on the adjustment data, adjust the generated composite media stream to generate an adjusted composite media stream; and stream, via the streaming protocol, the adjusted composite media stream to the computerized client device.

10. The computer readable apparatus of claim 8, wherein the receipt of the first control data comprises receipt of the first control data via a first communication channel having first prescribed quality of service attributes, the receipt of the first control data via the first communication channel comprising:

uplink of the first control data from a premises of the user to a computerized gateway apparatus, the uplink of the first control data comprising utilization of at least one air interface that uses unlicensed or quasi-licensed spectrum; and uplink of the computerized gateway apparatus to a cloud-based processing and aggregation entity, the cloud-based processing and aggregation entity configured to control, based at least on the first control data, aggregation of the plurality of digitally rendered content.

11. The computer readable apparatus of claim 10, wherein the stream of the generated composite media stream comprises a steam of the generated composite media stream via a second communication channel, the stream of the generated composite media stream via the second communication channel comprising a stream in a downlink to the premises via a QAM (quadrature amplitude modulation) modulated radio frequency channel carried over a hybrid fiber coaxial topology.

12. The computer readable apparatus of claim 10, wherein the uplink of the first control data comprises uplink via use of a 5G NR (Fifth Generation New Radio) low-latency channel via at least a mobile network operator (MNO) network in data communication with the content distribution network.

13. The computer readable apparatus of claim 8, wherein the first control data further comprises data relating to a user command to replace or substitute one of the plurality of digitally rendered content with another digitally rendered content.

14. A computerized method of operating a content delivery network, the computerized method comprising:

obtaining a plurality of digital content streams;

causing generation of an aggregated content stream, the aggregated content stream comprising at least two of the plurality of digital content streams;

causing transmission of the aggregated content stream to a computerized device associated with a user of the content delivery network;

receiving gesture command data with respect to the aggregated content stream, the gesture command data received from at least one of the computerized device or another computerized device associated with the user;

identifying a prescribed skill or command associated with the gesture command data; and causing implementation of the prescribed skill or command with respect to the aggregated content stream, the implementation of the prescribed skill or command comprising implementation of a temporal synchronization of the at least two of the plurality of digital content streams.

15. The computerized method of claim 14, wherein the implementation of the at least one of (i) the temporal synchronization of the at least two of the plurality of digital content streams comprises implementation of the temporal synchronization of the at least two of the plurality of digital content streams, the implementation of the temporal synchronization of the at least two of the plurality of digital content streams comprising:

utilizing the gesture command data in a machine learning algorithm to determine adjustment data;

based on the adjustment data, adjusting the at least two of the plurality of digital content streams to generate an adjusted aggregated content stream; and causing transmission of the adjusted aggregated content stream for consumption by the computerized device.

16. The computerized method of claim 15, wherein the computerized method is performed at least in part by a cloud-based data aggregation and analytics computerized process configured to (i) ingest the plurality of digital content streams from respective ones of a plurality of different sources, and (ii) encode the plurality of digital content streams using a common encoder process as part of said generation of the aggregated content stream in order to control said transmission of the aggregated content stream and the transmission of the adjusted aggregated content stream based at least on the prescribed skill or command associated with the gesture command data.

17. The computerized method of claim 16, further comprising:

receiving, via a low-latency wireless link, digitized data relating to speech to be integrated within one of the plurality of digital content streams; and causing, via the common encoder process, inclusion of at least a portion of the one of the plurality of digital content streams.

18. The computerized method of claim 14, further comprising receiving data representative of a request from the user to add said prescribed skill or command to a profile associated with a user skill specification maintained by a cloud-based processing entity.

19. The computerized method of claim 14, wherein the receiving of the gesture command data comprises receiving the gesture command data via a low-latency wireless link enabling preservation of a prescribed timing relationship or requirement between occurrence of a gesture associated with the gesture command data and the implementation of the prescribed skill or command associated with the gesture command data.

20. The computerized method of claim 19, wherein the receiving of the gesture command data via the low-latency wireless link comprises receiving digitized data relating to a speech command from the user, the low-latency wireless link enabling the preservation of the prescribed timing relationship or requirement between an utterance of the speech command and the implementation of the prescribed skill or command designated by the speech command.

21. The computerized method of claim 14, wherein the identifying of the prescribed skill or command comprises processing of the gesture command data to:
    evaluate at least two frames each comprising a plurality of pixels and representative of a portion of a human body, to determine a motion direction and extrapolate a rate of movement; and
    correlate the motion direction and the rate of movement to the prescribed skill or command.

\* \* \* \* \*